(12) United States Patent
Rottenberg et al.

(10) Patent No.: US 11,506,917 B2
(45) Date of Patent: Nov. 22, 2022

(54) OPTICAL DEVICE FOR FORMING A DISTRIBUTION OF A THREE-DIMENSIONAL LIGHT FIELD

(71) Applicant: IMEC VZW, Leuven (BE)

(72) Inventors: Xavier Rottenberg, Kessel-Lo (BE); Kristof Lodewijks, Wilsele (BE)

(73) Assignee: IMEC VZW, Leuven (BE)

( * ) Notice: Subject to any disclaimer, the term of this patent is extended or adjusted under 35 U.S.C. 154(b) by 195 days.

(21) Appl. No.: 16/966,456

(22) PCT Filed: Jan. 30, 2019

(86) PCT No.: PCT/EP2019/052261
§ 371 (c)(1),
(2) Date: Jul. 30, 2020

(87) PCT Pub. No.: WO2019/149785
PCT Pub. Date: Aug. 8, 2019

(65) Prior Publication Data
US 2021/0033895 A1   Feb. 4, 2021

(30) Foreign Application Priority Data

Jan. 31, 2018  (EP) .................................... 18154494

(51) Int. Cl.
G02F 1/01 (2006.01)
G02F 1/03 (2006.01)
G03H 1/22 (2006.01)

(52) U.S. Cl.
CPC ......... *G02F 1/0322* (2013.01); *G03H 1/2294* (2013.01); *G02F 2203/50* (2013.01); *G03H 2225/12* (2013.01); *G03H 2225/32* (2013.01)

(58) Field of Classification Search
CPC ............... G02F 1/0322; G02F 2203/50; G02F 2203/10; G02F 2203/60; G02F 1/0147
See application file for complete search history.

(56) References Cited

U.S. PATENT DOCUMENTS

2002/0149584 A1  10/2002 Simpson et al.
2004/0027646 A1   2/2004 Miller et al.
(Continued)

FOREIGN PATENT DOCUMENTS

EP         3203309 A1    8/2017
WO    WO-20161 25491 A1  8/2016
WO    WO-2017064509 A1   4/2017

OTHER PUBLICATIONS

Hosseini et al., An Optoelectronic framework enabled by low-dimensional phase-change films, vol. 511, Jun. 10, 2014.
(Continued)

*Primary Examiner* — Joseph P Martinez
(74) *Attorney, Agent, or Firm* — Moser Taboada

(57) ABSTRACT

An optical device for forming a distribution of a three-dimensional light field comprises: an array of individually addressable unit cells; each unit cell in the array of unit cells comprising a stack including: at least one electrode; and a resonance defining layer, comprising at least a phase change material, PCM, layer, wherein the resonance defining layer is patterned to define a geometric structure dimensioned for defining a wavelength-dependent in-plane resonance of an electromagnetic wave; wherein the at least one electrode causes a phase change of the phase change material based on receiving a control signal to alter a wavelength-dependency of resonance in the resonance defining layer for controlling the optical property of the unit cell; wherein unit cells in the array of unit cells are separated such that the PCM layer of a unit cell is separated from the PCM layer in an adjacent unit cell.

15 Claims, 17 Drawing Sheets

(56) References Cited

U.S. PATENT DOCUMENTS

| | | |
|---|---|---|
| 2007/0125997 A1 | 6/2007 | Kim |
| 2009/0103165 A1 | 4/2009 | Kothari et al. |
| 2010/0309539 A1 | 12/2010 | Kaye et al. |
| 2015/0160612 A1* | 6/2015 | Jung .................... G03H 1/2294 |
| | | 359/9 |
| 2017/0031231 A1 | 2/2017 | Bhaskaran et al. |
| 2017/0261662 A1 | 9/2017 | Lee et al. |
| 2018/0017840 A1* | 1/2018 | Broughton ............ G02F 1/0311 |

OTHER PUBLICATIONS

International Search Report for Application No. PCT/EP2019/052261, dated Feb. 22, 2019.

\* cited by examiner

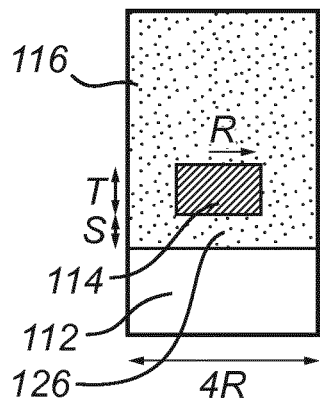 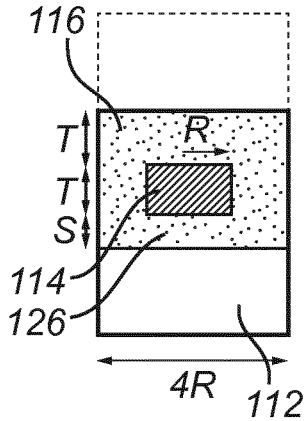 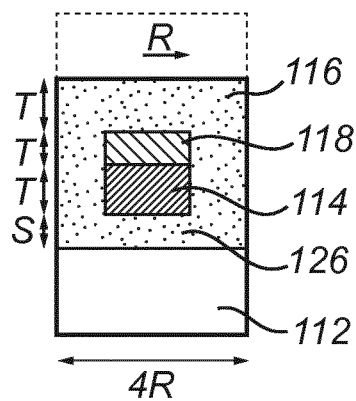
Fig. 4a     Fig. 4b     Fig. 4c
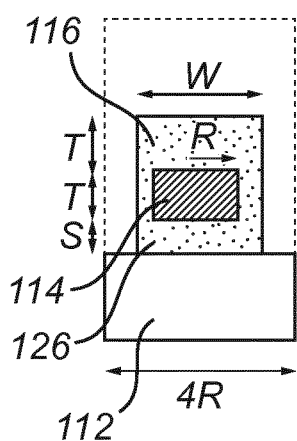 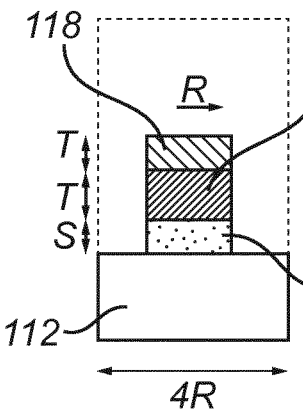 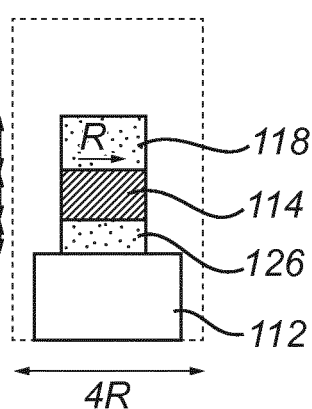
Fig. 4d     Fig. 4e     Fig. 4f
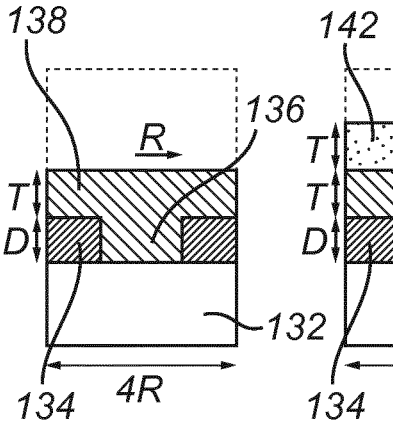 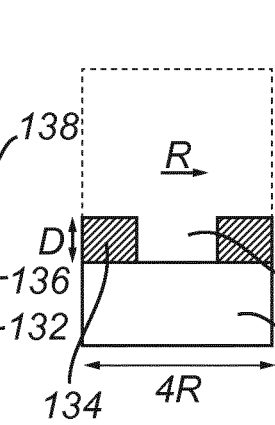 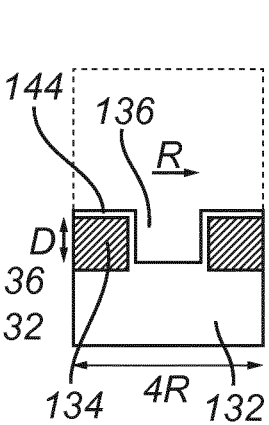
Fig. 5a     Fig. 5b     Fig. 5c     Fig. 5d

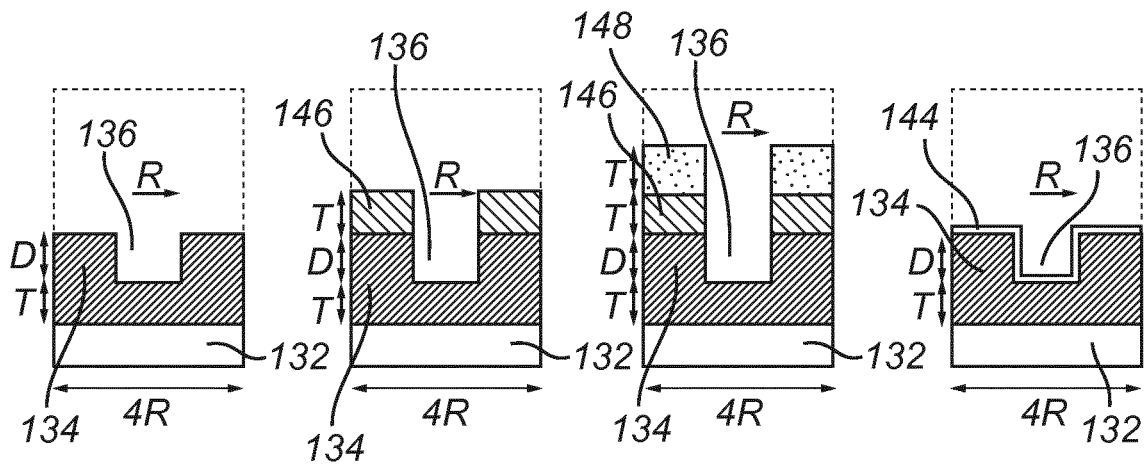
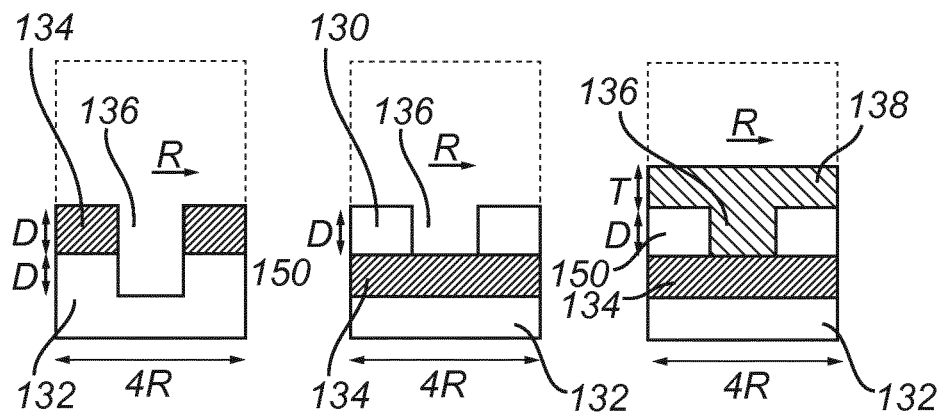
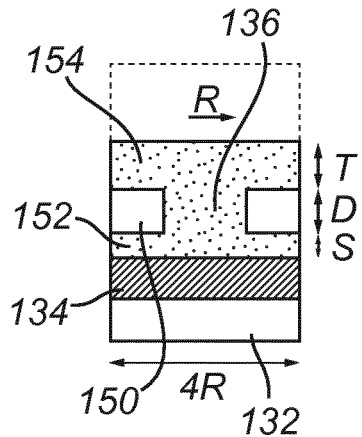
Fig. 5e  Fig. 5f  Fig. 5g  Fig. 5h
Fig. 5i  Fig. 5j  Fig. 5k
Fig. 5l

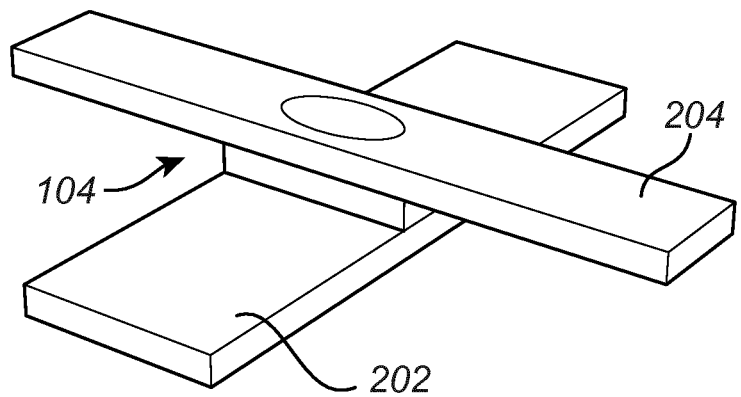
Fig. 6
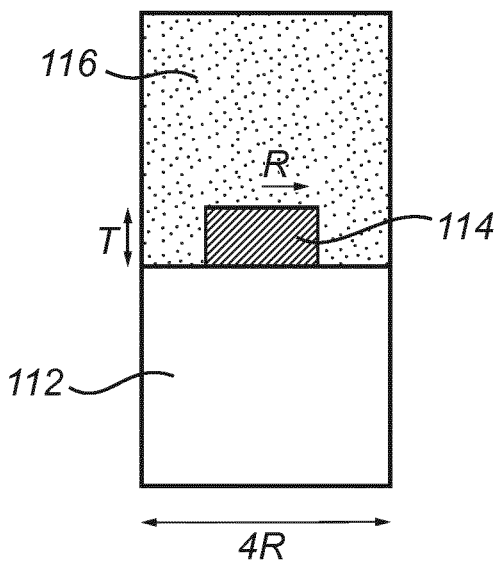 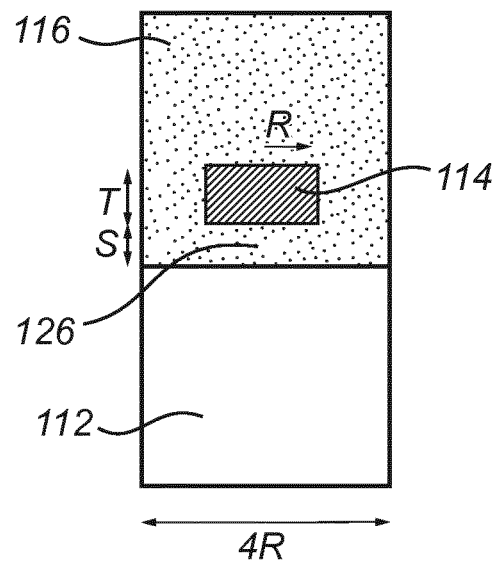
Fig. 7a  Fig. 7b
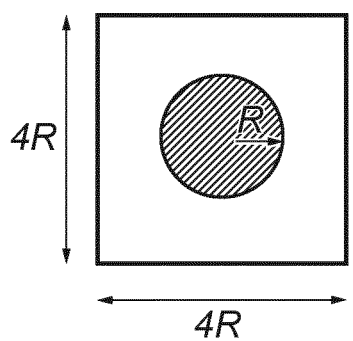 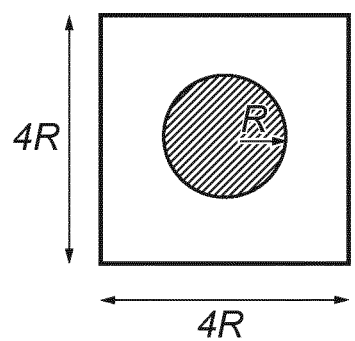
Fig. 7c  Fig. 7d

OPTICAL DEVICE FOR FORMING A DISTRIBUTION OF A THREE-DIMENSIONAL LIGHT FIELD

TECHNICAL FIELD

The present inventive concept relates to an optical device for forming a distribution of a three-dimensional light field. In particular, the present inventive concept relates to an optical device which may form a three-dimensional light field to display a holographic image.

BACKGROUND

A holographic image is formed by a three-dimensional control of a light field. In particular, if it is desired to present a changing holographic image, such as in presenting of holographic video, an optical device for forming the three-dimensional light field may need to be controlled so as to change properties.

Thus, for display of holographic images, a response of a unit cell in the optical device may need to be altered. In this regard, it is known to make use of a phase-change material (PCM) in order to enable changing the response of a stack of layers. The PCM may change between at least two well-defined states, wherein the PCM has different optical properties in the different states such that the optical device changes properties. Thus, a thin layer of PCM may be used in order to modulate an intensity and phase of light reflected or transmitted by the unit cell.

In Hosseini P., Wright C. D, Bhaskaran H., "*An optoelectronic framework enabled by low-dimensional phase-change films*", Nature, vol. 511, 10 Jul. 2014, pp. 206-211, it is demonstrated electrically induced stable color changes in both reflective and semi-transparent modes using extremely thin phase-change materials and transparent conductors. It is shown how a pixelated approach can be used in displays on both rigid and flexible films. A stack of a phase-change material, $Ge_2Sb_2Te_5$ (GST), sandwiched between two ITO layers is deposited on top of a reflective surface. A thickness of the bottom ITO layer may be varied in order to tune reflectivity of the stack for a given color depending on the state of the GST.

However, a larger difference in optical properties between different states of a unit cell would be desired, for example to improve brightness and/or clarity of a holographic image.

SUMMARY

An objective of the present inventive concept is to provide an improved optical device, which may be used for improved control of distribution of a three-dimensional light field.

This and other objectives of the invention are at least partly met by the invention as defined in the independent claims. Preferred embodiments are set out in the dependent claims.

According to a first aspect, there is provided an optical device for forming a distribution of a three-dimensional light field, said optical device comprising: an array of unit cells, wherein a unit cell in the array of unit cells is individually addressable for controlling an optical property of the unit cell; each unit cell in the array of unit cells comprising a stack including: at least one electrode for receiving a control signal for controlling the optical property of the unit cell; and a resonance defining layer, comprising at least a phase change material (PCM) layer, wherein the resonance defining layer is patterned to define a geometric structure, wherein the geometric structure is dimensioned at least in a plane of the resonance defining layer for defining a wavelength-dependency of resonance in the plane of the resonance defining layer; wherein the at least one electrode is configured to cause a phase change of the phase change material between a first state and a second state based on receiving the control signal and wherein a phase change of the phase change material alters a wavelength-dependency of resonance in the plane of the resonance defining layer for controlling the optical property of the unit cell; wherein unit cells in the array of unit cells are separated such that the PCM layer of a unit cell is separated from the PCM layer in an adjacent unit cell.

The optical device comprises a PCM layer which is patterned so as to control the resonance properties of the unit cell by defining a resonance in the plane of the resonance defining layer. Thus, in contrast to a geometry where thicknesses of layers in a multilayer stack of layers define an out-of-plane Fabry-Perot resonance (for one state of the PCM) resulting in destructive interference of incident rays and (multiply) reflected rays, the optical device of this disclosure uses a pattern including the phase change material to define an in-plane resonance.

It is an insight of the invention that by using the PCM layer to define a resonance of the unit cell, a difference in optical properties of the unit cell between the first state of the PCM and the second state of the PCM can be substantial, which may enable a strong response based on the PCM being in the first or second state. This implies that the optical device may enable accurate control of the distribution of the three-dimensional light field output by the optical device.

The resonance defining layer of the unit cell may be patterned such that a ratio of transmission or reflection (depending on whether the optical device is used for reflecting or transmitting an incoming light beam) of a wavelength by the unit cell between the first and the second state of the PCM is at least above 20, at least above 50, or at least above 100.

It should be realized that the optical device may be used for forming light fields for holographic display, but control of a three-dimensional light field may be useful in other applications as well. An optical device for forming a three-dimensional light field may project a controlled distribution in three dimensions of a transmitted light beam, which may be used in any type of application for controlled illumination and need not necessarily be combined with forming of a displayed image based on the three-dimensional light field.

The phase change material may have a phase change which is accompanied with a significant change in optical properties. The optical property may for instance be a complex refractive index or complex permittivity of the material.

The phase change material may be configured to switch between a crystalline state and an amorphous state. However, it should be realized that the first and second states may be other configurations of states of the phase change material. For instance, the phase change material may be configured to switch between two different crystalline states.

Thanks to the unit cells in the array of unit cells being separated such that the PCM layer of a unit cell is separated from the PCM layer in an adjacent unit cell, the PCM layers of adjacent unit cells may be individually controlled. This implies that each unit cell may be individually addressed and enables controlling of the distribution of an output three-dimensional light field by individually controlling the contribution from each of the unit cells by controlling the state of the PCM in each unit cell.

The separation of adjacent unit cells may be achieved by the PCM layers of adjacent unit cells being physically separated. However, the separation of the adjacent unit cells may further be achieved by a separation by at least one electrode of adjacent unit cells being physically separated. Thus, a control signal for triggering a phase change of the PCM of a unit cell may not affect an adjacent unit cell.

As indicated above, it is not only a thickness of the resonance defining layer that it is important for defining a geometric structure providing desired resonance properties of the unit cell. Rather, it is also important to form a geometric structure in the plane of the resonance defining layer that fits the wavelength for which a resonance is desired in either the first or the second state of the PCM.

According to an embodiment, the geometric structure is dimensioned at least in a plane of the resonance defining layer for defining a wavelength-dependency of resonance of a visible wavelength in the plane of the resonance defining layer.

The optical device may suitably be used with visible wavelengths, as this implies that the three-dimensional light field may be seen by people. In many applications, such as for creation of holographic images, use of visible wavelengths is desired. However, the optical device may alternatively be used with other wavelengths, such as near-infrared, infrared, or ultraviolet wavelengths. The geometric structure may therefore be dimensioned for defining a wavelength-dependency of resonance of a desired operational wavelength of the optical device.

The distribution of the three-dimensional light field may for instance be used for displaying a holographic image. The optical device may thus be used for displaying a holographic image or a video of holographic images.

However, it should be realized that control of a three-dimensional light field may be useful in other applications as well. The three-dimensional light field may project a controlled distribution in three dimensions of an incident light beam, which may be used in various applications, such as light detecting and ranging (lidar), 3D memories, and as an advanced illumination source for imaging systems.

According to an embodiment, the geometric structure extends in one direction in the plane of the PCM layer defining a length of the geometric structure, wherein the geometric structure is dimensioned such that a thickness of the geometric structure is in a range between 0.25*the length of the geometric structure and 1*the length of the geometric structure, wherein the length of the geometric structure is smaller than $\lambda/2$, wherein $\lambda$ is a wavelength of light to be used with the unit cell.

With such dimensions, it may be possible to form an in-plane resonance in the resonance defining layer, such that a strong difference between the optical properties of the unit cell for the first and the second state of the PCM may be provided.

According to a further embodiment, the thickness of the geometric structure in the PCM layer is at least 20 nm.

Since the in-plane resonance may be mainly formed in the PCM layer, the PCM layer should not be too thin. This implies that there is a sufficient amount of material in the PCM layer in order to generate a strong difference between optical properties of the unit cell for the first and the second state of the PCM.

According to an embodiment, the geometric structure is circular in the plane of the resonance defining layer.

This implies that a symmetric impact on incoming light may be provided by the geometric structure. When discussing a length of a circular geometric structure, the diameter of the circular geometric structure should be used as the length.

According to an embodiment, the geometric structure has a first size in a first direction in the plane of the resonance defining layer and a second size, different from the first size, in a second direction, different from the first direction, in the plane of the resonance defining layer.

This implies that the geometric structure may be adapted for use with plural wavelengths. Thus, using an elliptical or rectangular shape of the geometric structure, the unit cell may be adapted to provide desired properties for two different wavelengths using two orthogonal linear polarizations. Thus, the device may provide a flexibility for being used with different wavelengths.

It should be realized that more than two different sizes may be defined by the geometric structure. For instance, the geometric structure may have a hexagonal shape, which may allow the unit cell to be adapted to provide desired properties for three different wavelengths.

The geometric structure may be formed in many different ways in order to provide desired optical properties. Dimensioning of the geometric structure may depend on the environment in which a patterned PCM layer is arranged for forming the geometric structure. There may be different advantages of different set-ups of the stack of the unit cells including the resonance defining layer and the geometric structure may be designed or dimensioned in dependence of different set-ups in order to provide desired optical properties. For instance, some set-ups may allow the geometric structure to be small and/or thin, enabling a dense arrangement of the array of unit cells. Other set-ups may allow a very large difference in optical properties between the first and the second states, which may facilitate accurate control of the distribution of the three-dimensional light field and, for instance, enabling display of holographic images of high quality.

According to an embodiment, wherein the geometric structure is a patterned nanoparticle formed by the phase change material.

This implies that the geometric structure is provided in the form of a particle formed in phase change material. This implies a relatively simple structure is formed as the geometric structure is provided as a positive structure formed as a particle. However, it should be realized, as further described below, that the geometric structure may instead be formed as a cavity in the phase change material.

According to an embodiment, the stack of the unit cell further comprises a dielectric material arranged on the patterned nanoparticle.

The dielectric material may define an environment to the nanoparticle so as to control a refractive index of a material on the patterned nanoparticle. The dielectric material may be chosen in order to design a refractive index of the environment to the nanoparticle.

The patterned nanoparticle may alternatively be exposed to an outer environment, such as air. However, it may be advantageous to at least have a thin dielectric liner layer on the patterned nanoparticle in order to protect the geometric structure. In particular, a liner layer may protect the phase-change material during switching of states of the phase-change material. The switching of states may involve operating at a high temperature, which may cause oxidation of the phase-change material if the patterned nanoparticle would be exposed to the outer environment.

According to an embodiment, the stack of the unit cell further comprises a first dielectric material arranged on the patterned nanoparticle and a second dielectric material arranged on the first dielectric material, wherein the first dielectric material has a larger refractive index than the second dielectric material.

This may be used for further designing an environment to the nanoparticle. The first dielectric material and the second dielectric material may be arranged as a stack on the patterned nanoparticle. According to an embodiment, the stack of the first dielectric material and the second dielectric material may function to minimize reflection from the nanoparticles, while not acting as an anti-reflective coating between the nanoparticles of unit cells.

According to an embodiment, the stack of the unit cell further comprises a spacer layer of a dielectric material, wherein the spacer layer is arranged between the electrode and the patterned nanoparticle.

The electrode may function as a reflecting surface, wherein the reflection provided by the electrode is controlled by the resonance defining layer. The patterning of the nanoparticle should take into account the effect of the spacer layer, as presence of the spacer layer may affect dimensions of the nanoparticle to be used in order for in-plane resonance to occur and desired optical properties to be provided. Presence of the spacer layer may allow using a small thickness of the nanoparticle.

The nanoparticle may be arranged to be embedded in a dielectric material forming a spacer layer between the electrode and the nanoparticle. Thus, the dielectric layer may be surrounding the nanoparticle to form the spacer layer between the electrode and the nanoparticle and also provide an environment above and on sides of the nanoparticle.

According to an embodiment, the spacer layer may comprise a first dielectric material and the stack of the unit cell may further comprise a second dielectric material arranged on the patterned nanoparticle, wherein the second dielectric material has a larger refractive index than the first dielectric material. The nanoparticle with the layer of second dielectric material may or may not be embedded in the first dielectric material forming the spacer layer. Having the second dielectric material in the stack may further allow designing of the optical properties provided by the resonance defining layer based on a thickness and/or size of a layer of second dielectric material.

According to an embodiment, the geometric structure comprises a cavity defined by patterned walls in a material of the resonance defining layer.

As a cavity and a particle may in optical terms be considered as inverse to each other, the optical properties of the unit cell may be configured in a corresponding manner for a nanoparticle or for a cavity.

The cavity may be formed in a PCM layer, corresponding to the use of a nanoparticle in the PCM layer as described above. However, in another embodiment, a first thickness of the PCM layer may be provided such that a bottom surface of the cavity may be defined by the first thickness of the PCM layer. Further, patterned walls of the cavity may be formed on the first thickness of the PCM layer. The patterned walls may be formed in the PCM layer, such that side walls and a bottom surface of the cavity are formed by PCM material. Alternatively, the patterned walls may be formed in a metal layer arranged above the homogeneous thickness of the PCM layer.

For a cavity, a thickness of the geometric structure should be construed as a depth of the cavity being defined as a height of the patterned wall above a bottom surface of the cavity. Thus, as used herein, a thickness of the geometric structure should be construed as a thickness of a nanoparticle, if the geometric structure comprises a nanoparticle, or a depth of a cavity, if the geometric structure comprises a cavity.

For a cavity, a length of the geometric structure should correspond to a length between the patterned walls. For a circular shape defined inside the patterned walls, the length should be construed as a diameter of the circular shape defined by the patterned walls.

According to an embodiment, the cavity is filled by a dielectric material.

The dielectric material may define an environment in the cavity so as to control a refractive index of a material in the cavity. The dielectric material may be chosen in order to design a refractive index of the environment in the cavity.

According to an embodiment, the resonance defining layer comprises a first thickness of the phase change material at a bottom of the cavity and the patterned walls being formed by the phase change material in wall portions having a second thickness larger than the first thickness.

This implies that the side walls and the bottom surface of the cavity are formed by the phase change material. The optical properties of the unit cell may thus be designed by changing the first thickness of the phase change material, changing the second thickness of the phase change material and changing dimensions of the cavity, i.e. a lateral size of the cavity.

According to an embodiment, wherein the stack of the unit cell further comprises at least one layer of dielectric material on top of the patterned walls of phase change material.

The at least one layer of dielectric material may thus be used for defining a larger depth of the cavity, which may be used in designing the optical properties of the unit cell.

The at least one layer of dielectric material on top of the patterned walls may be a single layer of dielectric material. However, in another embodiment, the at least one layer of dielectric material on top of the patterned walls may comprise a first layer of a first dielectric material and a second layer of a second dielectric material, wherein the first dielectric material has a larger refractive index than the second dielectric material.

According to an embodiment, the stack comprises a top metal layer providing a coating of walls and bottom of the cavity.

A thin top metal layer may form a liner which may protect the geometric structure. The top metal layer may enhance resonance of the geometric structure while allowing the geometric structure to be designed and dimensioned for defining in-plane resonance.

In an embodiment, the top metal layer may have a thickness smaller than 10 nm. This may imply that the resonance of the geometric structure may be defined by the dimensions of the geometric structure.

The top metal layer may also provide a coating on the PCM layer or any other material forming a top surface of the patterned walls. According to another embodiment, the top metal layer may provide a coating, which need not be present on all surfaces of the cavity. For instance, the top metal layer may provide a coating on side walls of the cavity or on the bottom of the cavity.

Similar to the discussion of the patterned nanoparticle, the geometric structure comprising a cavity may advantageously have at least a thin dielectric liner layer arranged to cover the geometric structure in order to protect the geometric structure. In particular, a liner layer may protect the phase-change material and/or a metal layer in the geometric structure during switching of states of the phase-change material. The switching of states may involve operating at a high temperature, which may cause oxidation of the phase-change material or a metal if the material would be exposed to the outer environment.

According to an embodiment, the resonance defining layer comprises a PCM layer with homogeneous thickness and a patterned metal layer on the PCM layer, wherein the cavity is defined by patterned walls in the metal layer.

This implies that the PCM layer may define a bottom surface below the cavity, whereas dimensions of the geometric structure of the cavity may be defined by the metal layer. Thus, a thickness of the PCM layer as well as a thickness of the patterned metal layer (defining a depth of the cavity) and a lateral size of the cavity (distance between the patterned walls) may be used for designing the optical properties of the unit cell.

According to an embodiment, the stack of the unit cell further comprises a spacer layer of a dielectric material between the electrode and the patterned walls defining the cavity.

The spacer layer may be arranged on the electrode and define a bottom surface of the cavity. However, in an embodiment comprising the PCM layer with homogeneous thickness and a patterned metal layer above the PCM layer, the spacer layer may be arranged on the PCM layer to define a bottom surface of the cavity. In yet another embodiment, the spacer layer may be arranged on the electrode and the PCM layer may be arranged on the spacer layer, wherein the PCM layer may define the bottom surface of the cavity.

The spacer layer between the electrode/PCM layer and the patterned cavity sets an environment in which the cavity is arranged, and the cavity may be patterned in relation to the effect of the spacer layer. Further, a thickness of the spacer layer may be used in designing the optical properties of the unit cell.

The geometric structure of the cavity may be arranged to be embedded in a dielectric material forming a spacer layer between the electrode/PCM layer and the cavity, wherein the dielectric layer also fills the cavity and forms an upper layer above the cavity.

According to an embodiment, the optical device further comprises a transparent electrode arranged on the array of unit cells.

The transparent electrode may provide a common potential to the array of unit cells or a plurality of unit cells within the array, such that the at least one electrode in the stack of a unit cell may receive a signal in relation to the common potential provided by the transparent electrode for controlling a phase change of the PCM in the unit cell. This implies that a single electrode may be provided in the stack of the unit cell, while a transparent electrode may be provided to be shared by several unit cells.

By using a transparent electrode, the electrode may be arranged above the stack of the unit cell without interacting with light which is to be incident on the stack of the unit cell.

According to an embodiment, the array of unit cells further comprises bottom line electrodes, each extending under a row of unit cells in the array of unit cells and top line electrodes, each extending over a column of unit cells in the array of unit cells, wherein the top line electrodes are transparent or comprise transparent portions over the unit cells.

This implies that a unit cell may be individually addressable by means of a combination of signals on the bottom line electrodes and top line electrodes.

The top line electrode may comprise patterned walls for defining a cavity in a metal layer in position of a unit cell. Thus, the cavity may be formed in the top line electrode, which may also function for controlling the state of the PCM layer of the unit cell. Then the top line electrode may or may not be formed in a transparent material.

According to an embodiment, the electrode of each unit cell is transparent for providing a unit cell configured to transmit light through the unit cell.

Thus, the optical device may be used for transmission of a light beam received on the array of unit cells.

According to another embodiment, the electrode of each unit cell is reflective (or each unit cell includes a reflective layer). Thus, the optical device may be used for reflection of a light beam received on the array of unit cells.

According to an embodiment, wherein the phase change material is a compound of germanium, antimony and tellurium, GST.

For instance, the phase change material may be formed by $Ge_2Sb_2Te_5$ (GST). This is a material which may change between an amorphous state and a crystalline state and which may suitably be used for providing desired optical properties of the array of unit cells.

However, it should be realized that the phase change material may be any material which provides a change in optical property based on the switching between two states. The phase change material may for instance be any material which may undergo a phase change in relation to being exposed to a temperature (a thermochromic material) or in relation to being exposed to light (a photochromic material) or a combination of such materials. For example, a number of different forms of vanadium oxides, such as $VO_2$ and $V_2O_3$, may be used. The phase change material may include thermochromic materials formed from metal-oxide materials, such as vanadium oxide as mentioned above, polymers, such as azobenzene-containing polydiacetyelenes, or nano-structured polymers, such as diblock (poly[styrene-b-isoprene]) copolymers. The phase change material may alternatively be an electro-optic material that changes an optical property based on an applied electrical field, such as a birefringent material, or an magneto-optic material that changes an optical property based on an applied magnetical field, such as garnets and ferro-magnetic metals.

According to an embodiment, the geometric structure of a first unit cell in the array of unit cells is differently dimensioned in relation to the geometric structure of a second unit cell in the array of unit cells.

This implies that two unit cells in the array of unit cells may have different influence on a light beam incident on the unit cells. This may be used such that different unit cells may be adapted to be used with different target wavelengths of the incident light beam. Thus, the array of unit cells may be designed to be used with different wavelengths of the incident light beam.

BRIEF DESCRIPTION OF THE DRAWINGS

The above, as well as additional objects, features and advantages of the present inventive concept, will be better understood through the following illustrative and non-limiting detailed description, with reference to the appended drawings. In the drawings like reference numerals will be used for like elements unless stated otherwise.

FIGS. 3a-l, FIGS. 4a-f and FIGS. 5a-l are schematic views of different configurations of unit cells.

FIG. 6 is a schematic view of electrodes in a cross-point configuration in relation to a unit cell.

FIG. 7a-d are schematic views of configurations of unit cell for simulation of optical properties.

FIGS. 8a-f shows charts illustrating reflection ratios of configurations of unit cell shown in FIG. 7a.

DETAILED DESCRIPTION

Figure 1:
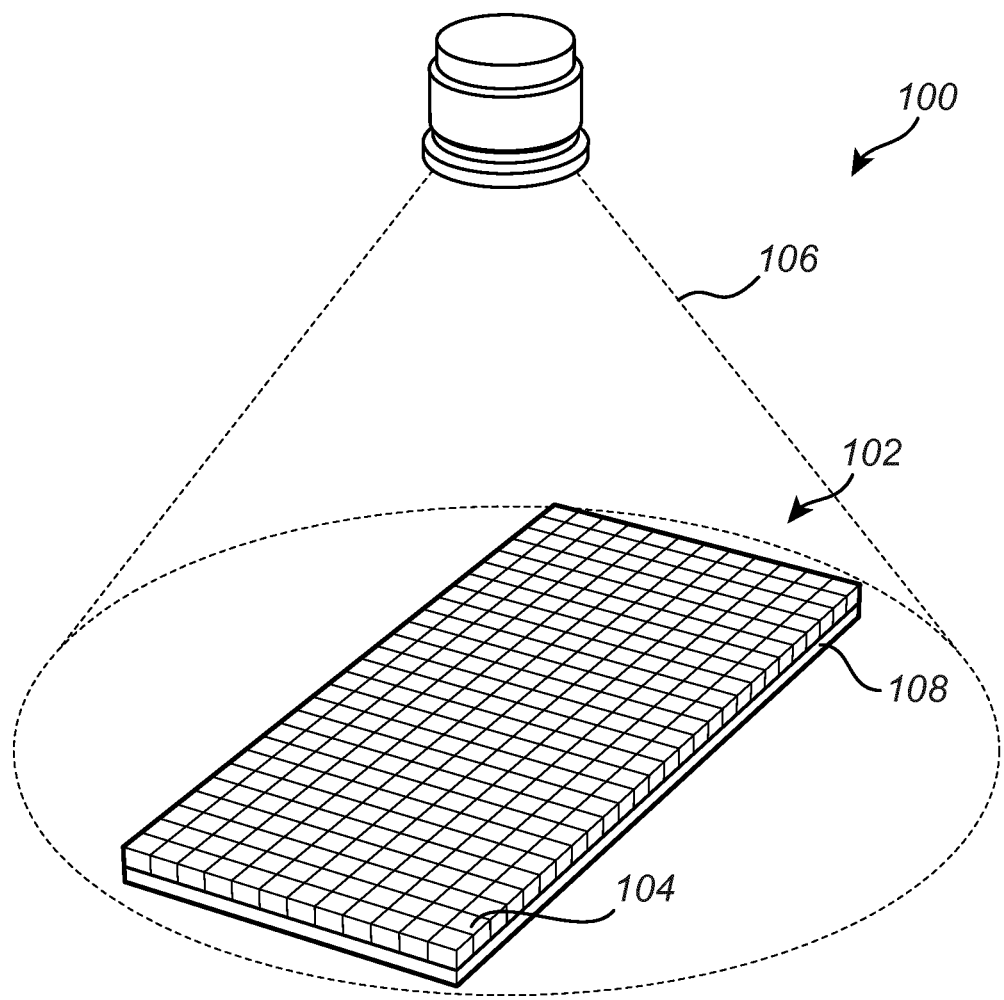
FIG. 1 is a schematic view of an optical device according to an embodiment.

Referring now to FIG. 1, an optical device 100 will be generally described. The optical device 100 may comprise an array 102 of unit cells 104. Unit cells in the array 102 of unit cells 104 may be individually addressable for controlling an optical property of the unit cell 104 and hence controlling an optical response of the array 102 of unit cells 104.

Each unit cell 104 may be individually addressable. However, it should be realized that not necessarily each and every one of the unit cells 104 is individually addressable.

By controlling the optical property of the unit cells 104, an effect on a light beam 106 incident on the array 102 may be controlled. Thus, the unit cells 104 may in combination form a controllable effect on the incident light beam 106. Thus, the array 102 may be used for forming and controlling a distribution of a three-dimensional light field based on the incident light beam 106.

The three-dimensional light field may for instance be used for displaying a holographic image. Thanks to the unit cells 104 being controllable, a change in the holographic image formed may be provided. This implies that the optical device 100 may be used for displaying a video of holographic images.

However, it should be realized that control of a three-dimensional light field may be useful in other applications as well. The optical device 100 for forming a three-dimensional light field may project a controlled distribution in three dimensions of an incident light beam, which may be used in any type of application for controlled illumination and need not necessarily be combined with forming of a displayed image based on the three-dimensional light field.

The optical device 100 may be set up for reflecting the incident light beam 106 or transmission of the incident light beam 106. The light beam 106 may be formed by a coherent light source, such as the light beam 106 being a laser beam, which provides a well-defined relation of the incident light field on the array 102 of unit cells 104 and, hence, is suitable for using as a basis for forming the desired distribution of the three-dimensional light field using the array 102 of unit cells 104.

The unit cells 104 comprise a resonance defining layer including a phase change material (PCM) layer. The resonance defining layer is patterned to define a geometric structure, which may be at least partly present in the PCM layer. The geometric structure is dimensioned at least in a plane of the resonance defining layer, which may be parallel to a substrate 108 on which the array 102 of unit cells 104 is formed.

The dimensioning of the geometric structure is designed so as to define a resonance in the plane of the resonance defining layer. The geometric structure and the unit cell 104 may be designed so as to adapt the optical properties of the unit cell 104 to a wavelength of the incident light beam 106 with which it is intended that the optical device 100 is to be used.

Different dimensions of the geometric structure may change a resonance of the unit cell 104 depending on the wavelength of incident light. Thus, by using a specific selection of dimensions of the geometric structure, the optical device 100 may be adapted for use with a specific wavelength. A wavelength-dependency of the resonance to the dimensions of the geometric structure may thus be used for choosing suitable dimensions of the geometric structure in relation to the wavelength to be used with the optical device 100.

By properly designing the geometric structure of the resonance defining layer, it is possible to excite local resonances which are strongly dependent on the exact dimensions of the geometric structure while the spectral positions of these resonances are strongly dependent of a material state of the PCM.

Thanks to exciting of local resonances in the plane of the resonance defining layer and that these resonances are very strongly dependent on a state of the PCM, very large differences in an effect on incident light of a unit cell 104 may be provided in dependence of the state of the PCM set for the unit cell 104. This enables very accurate control of the distribution of the three-dimensional light field and may also enable providing high resolution in the formed three-dimensional light field.

Below a number of different embodiments of geometric structures will be provided, which may enable using a resonance in the plane of the resonance defining layer for controlling an optical property of the unit cells 104.

All of such geometries will act as "switchable" or "tunable" antennas, which may allow controlling the optical properties of the unit cells 104 by switching a state of the PCM.

The phase change material GST ($Ge_2Sb_2Te_5$) may be suitably used in the unit cells 104. GST may thermally be switched between a crystalline and amorphous state (by controlling the cooling down rate) and may therefore provide a simple manner of controlling the state of the PCM. In the example results below, GST is used. However, it should be realized that other phase change materials may be used instead.

In the specific case of using GST as the PCM, switching the material modifies the structure from a plasmonic (crystalline state) to a dielectric (amorphous state) antenna, which will exhibit very similar resonances but at different wavelengths, allowing to change the structure from a highly reflective to a low reflective state for a given wavelength.

Upon switching of the state of GST, the optical properties are significantly altered, resulting in large changes in both real and imaginary parts of refractive index and permittivity. It should be noted that in its crystalline state, GST has a negative real part of the permittivity, which implies that it shows metallic behavior and therefore supports plasmonic resonances. In its amorphous state, GST has a positive real part of the permittivity, accompanied with a large imaginary part, meaning that it acts as a highly lossy dielectric.

The PCM in a unit cell 104 could be switched thermally (as for GST) but is not limited to that. It should be realized that in different embodiments, electro-optic materials, and magneto-optic materials may be used as alternative implementations.

In the embodiments discussed below, two main geometries of the geometric structure are considered. These two main geometries may be considered as the inverse of one and other and, therefore, either of the main geometries may be used for defining the in-plane resonance of the geometric structure.

A first geometry relates to a nanoparticle from a patterned PCM layer. A second geometry relates to a cavity formed in the resonance defining layer, which cavity may be formed by patterned PCM layer. In both geometries, switching the PCM between the first and the second state will modify the resonance of the geometric structure.

The localized resonances in the nanoparticles or cavities strongly depend on in-plane and out-of-plane dimensions, allowing to create a very strong modulation of the optical properties of the unit cell 104.

Referring now to FIG. 2a-d, a first embodiment comprising a configuration of unit cells 104 including a nanoparticle will be discussed and a second embodiment comprising a configuration of unit cells 104 including a cavity will be discussed in relation to relevant dimensions to be used in the unit cells 104.

Figure 2A:
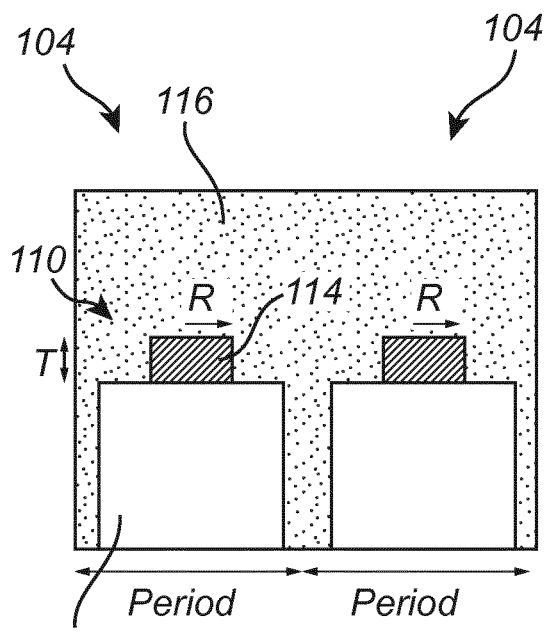
FIGS. 2a-d are schematic views of configurations of unit cells in an array.
Figure 2C:
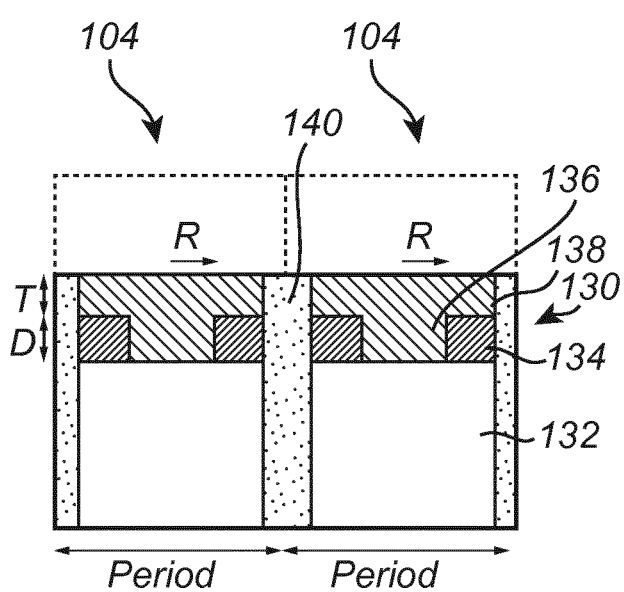
Figure 2B:
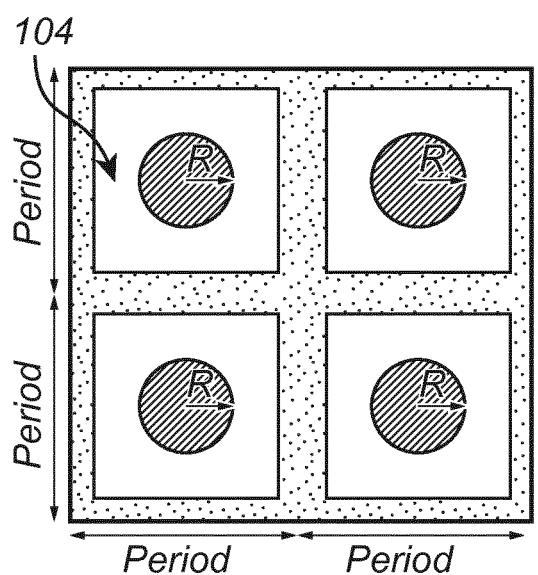
Figure 2D:
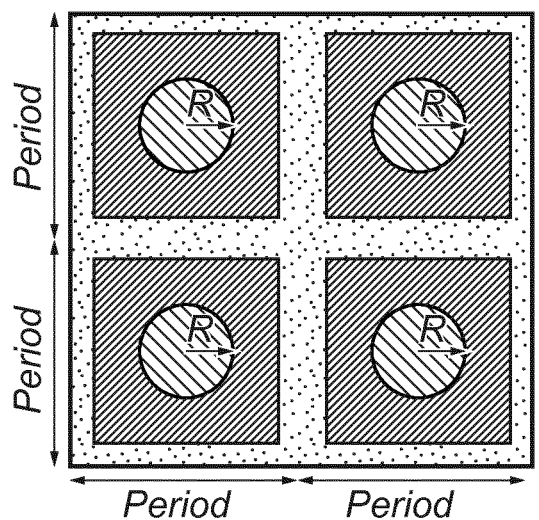

FIG. 2a shows a side view of the first embodiment indicating a stack 110 of two adjacent unit cells 104. FIG. 2b shows a top view of the first embodiment. Similarly, FIG. 2c shows a side view of the second embodiment indicating a stack 130 of two adjacent unit cells 104. FIG. 2d shows a top view of the second embodiment.

In the first embodiment, the stack 110 comprises an electrode 112, a patterned PCM layer forming a nanoparticle 114 on the electrode 112 and a surrounding dielectric material 116, e.g. in form of an oxide 116.

In the second embodiment, the stack 130 comprises an electrode 132, a patterned PCM layer 134 comprising patterned walls for defining a cavity 136 and a dielectric material 138 filling the cavity 136 and also arranged above the PCM layer 134. An oxide 140 is arranged between adjacent unit cells 104 for separating the electrodes 132 and separating the patterned PCM layers 134 of adjacent unit cells 104.

In both the first embodiment and the second embodiment, the resonance defining layer is formed in a patterned PCM layer 114, 134. A dimension of the geometric structure is defined by a radius R of the nanoparticle 114 or the cavity 136 defined by the patterned PCM layer 134. Further, another dimension of the geometric structure is defined by a thickness T of the nanoparticle 114 and a corresponding depth D of the cavity 136.

The electrodes 112, 132 may be part of a conductor line such that a current may be transmitted through the electrode 112, 132 and the PCM layer 114, 134 for providing a local thermal heating and, hence, controlling a switching of the state of the PCM of the unit cell 104. It should be realized that a control signal may be provided by the electrodes 112, 132 in many different ways. For instance, the electrodes 112, 132 below the PCM layer 114, 134 may be split in two for providing two electrodes 112, 132 and controlling the unit cell 104 by changing a voltage connected to at least one of the electrodes. As a further alternative, a second electrode may be provided above the stack 110, 130 of the unit cell 104 such that the unit cell 104 may be controlled by changing a voltage connected to at least one of the electrodes.

An anti-reflective coating (ARC) may be arranged on the nanoparticle 114 and on the cavity 136 of the first and second embodiments. The anti-reflective coating may at least partly be formed by the surrounding dielectric material(s) as discussed above, but separate material layers for forming the ARC may also be used.

It should be realized that the patterning of electrodes, PCM layer, ARC layer and surrounding oxide may be varied in many different ways and depends on the specific embodiments as will be described below. Specific embodiments, which may include further features in the stack of the unit cells 104 may allow to further tailor the optical unit cell performance. Also, features may be included or varied to provide other added advantages to the unit cell 104, such as thermal and/or electrical isolation of neighboring cells 104.

As indicated in FIGS. 2a-d, the array 102 of unit cells 104 provide a periodicity of unit cells. A period P defining a size of the unit cell 104 may advantageously not be too large.

Using a periodicity below $\lambda$, where $\lambda$ is the wavelength of light with which the optical device 100 is to be used, may be advantageous in suppressing forming of ghost images. According to one embodiment, the periodicity may be set to be P<$\lambda$/2.

In order to provide an optical device 100 which is easy to manufacture, the periodicity may be set to P>2.5R. However, in some embodiments the unit cells 104 may be arranged very close to each other, such that the periodicity may be set to P>2R.

The periodicities may advantageously be well below the wavelength. In such case, each unit cell 104 can be considered as a point scatterer that is either on or off, which allows to get improved control over the phase of light scattered by the optical device 100.

The dimensions of the geometric structure may depend on the configuration of the stack 110, 130 of the unit cells 104 and on combinations of materials and, hence, material properties. This will be illustrated below, wherein suitable dimensions for some configurations will be indicated.

It may be possible to define a range of parameters within which the dimensions of the geometric structure should be selected, based on the desired optical properties. As mentioned above, a dimension of the geometric structure may be defined by a radius R of a circular shape. For other shapes, a size or a length of the geometric structure may correspond to the size of an edge of the geometric structure, such as a length W of a side for a square shape. In this regard, the size may be compared to the radius as corresponding to W=2R. Thus, for a circular shape, the diameter of the circle may be said to correspond to a length of the geometric structure.

The geometric structure may preferably be within the following ranges:

A minimum radius may be set to 10 nm. This is mainly process-limited, so with development of processes for forming miniature structures, the minimum radius may be set even smaller.

A maximum radius may be specified based on periodicity constraints and the wavelength to be used. A maximum periodicity may be given by $P_{max}=\lambda/2$, as indicated above. Further the periodicity may be related to the radius R, as $P=\alpha R$ (with $2<\alpha<=5$). The lower limit of a is given as explained above, whereas an upper limit of 5 may be chosen as it may be desired to have a dense scatter array, and therefore a is unlikely to be larger than 5. This gives an expression of the maximum radius $R_{max}=\lambda/2\alpha$.

Similar to the size of the radius, a range may be defined within which the thickness/depth of the geometric structure may be selected.

A minimum thickness/depth may be set to 20 nm. Simulations and tests indicate that a smaller thickness/depth do not show the desired in-plane resonance. A maximum thickness/depth should be set to $<=2R$ in order to give desired optical properties.

In an embodiment, a range of the thickness/depth may be defined as $0.5R<=\text{thickness/depth}<=2R$. Dimensions of the geometric structure may be selected within this range in order to obtain desired optical properties.

As mentioned above, an ARC may be arranged on the geometric structure. Simulations and tests indicate that the ARC thickness may need to differ from a plain film stack, as the functionality as an ARC relies on the combined effect of scattered/reflected light in the cavity/nanoparticle region and the areas in between.

The refractive index $n_{ARC}$ of the ARC may be defined as $n_{surroundings}<n_{ARC}<n_{reflective\ layer}$. The refractive index $n_{ARC}$ may advantageously be fairly high with respect to surroundings as this may imply that light is trapped more efficiently.

Further, a theoretical optimum thickness $t_{ARC}$ of the ARC may, for perpendicular incidence of light, be given by $t_{ARC}=(2m+1)\lambda/4n_{ARC}$, where m is an integer number (m=0, 1, 2, ... ).

Moreover, in the combined layer stack, it is likely to find an optimum thickness for the dielectric ARC layer that is slightly below the theoretical optimum. This optimum thickness may depend on a small depth of a layer on top of which the ARC layer is positioned and the localized resonance that is excited in such layer.

Referring now to FIGS. 3a-l, some different configurations of the stack 110 of the unit cell 104 comprising a nanoparticle 114 are disclosed. These configurations show several features which may be present in various combinations. Thus, further combinations of features of the configurations of the stack 110 may be contemplated.

It should be realized that dimensions of different features in the stack 110 may be varied and proper dimensions may be selected in order to obtain desired optical properties of the stack 110. In any of the configurations discussed below the geometric structure of the PCM layer 114, 134 may be designed by selecting size (e.g. radius R) and thickness/depth of the structure.

Each of the stacks 110 in FIGS. 3a-l comprise an electrode 112 and a patterned nanoparticle on the electrode 112. The electrode 112 may be a metal film, which may provide a reflective surface.

Figure 3A:
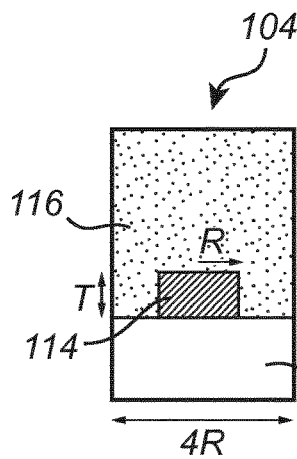

In FIG. 3a, a surrounding dielectric material 116 is arranged on top and on the sides of the patterned nanoparticle 114. The dielectric material 116 defines a refractive index of a material surrounding the nanoparticle 114.

Figure 3B:
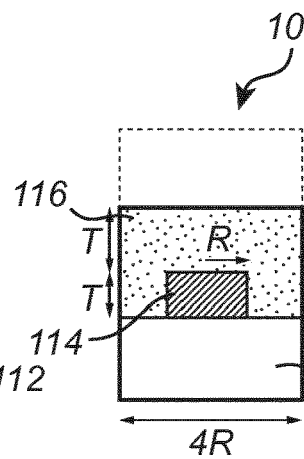

In FIG. 3b, the surrounding dielectric material 116 is arranged on top and on the sides of the patterned nanoparticle 114. A thickness of the dielectric material 116 is defined and a value of thickness, as well as the refractive index of the dielectric material 116, may be selected in designing desired optical properties of the stack 110.

Figure 3C:
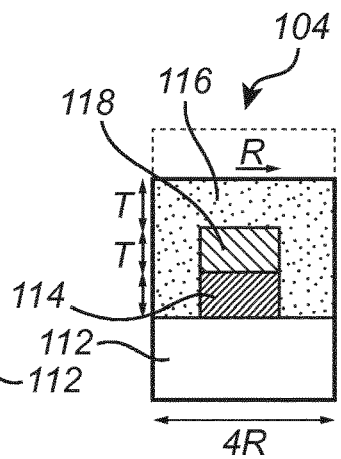

In FIG. 3c, a first dielectric material 118 is arranged on the nanoparticle 114 and may be patterned to have common lateral dimensions as the nanoparticle 114. A second dielectric material 116 is arranged to surround the stack of the nanoparticle 114 and the first dielectric material 114. The first dielectric material 118 may have a larger refractive index than the second dielectric material 116. Thicknesses and refractive indices of the first dielectric material 118 and the second dielectric material 116 may be selected in designing desired optical properties of the stack 110.

Figure 3D:
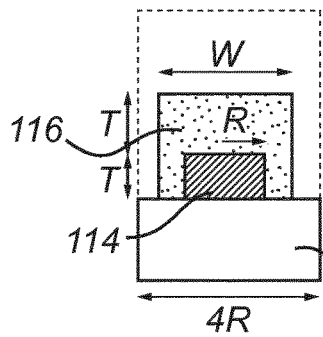

In FIG. 3d, the surrounding dielectric material 116 may be arranged on top and on the sides of the patterned nanoparticle 114. A lateral size of the surrounding dielectric material 116 may define a width of the surrounding dielectric material 116. Thickness, width and refractive index of the first dielectric material 116 may be selected in designing desired optical properties of the stack 110.

Figure 3E:
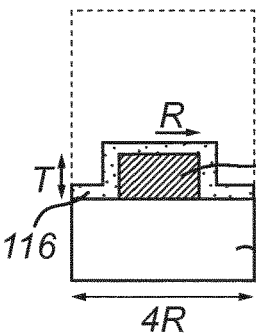

In FIG. 3e, a first dielectric material 116 is configured to provide a layer of a fixed thickness on top and on the sides of the patterned nanoparticle 114. Thickness and refractive index of the first dielectric material 116 of the layer may be selected in designing desired optical properties of the stack 110.

Figure 3F:
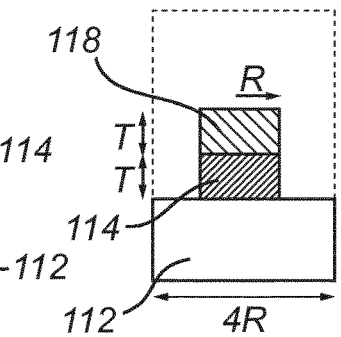

In FIG. 3f, a dielectric material 118 is arranged on the nanoparticle 114 and may be patterned to have common lateral dimensions as the nanoparticle 114. The stack of the nanoparticle 114 and the first dielectric material 118 may be surrounded by air or ambient environment. Thickness and refractive index of the dielectric material 118 may be selected in designing desired optical properties of the stack 110.

Figure 3G:
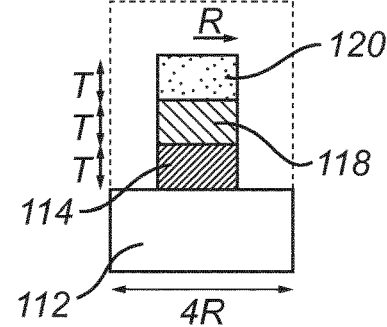

In FIG. 3g, an additional dielectric material 120 is arranged on the nanoparticle 114 and the dielectric material 118 shown in FIG. 3f and may be patterned to have common lateral dimensions as the nanoparticle 114 and the dielectric material 118, so that a stack of the nanoparticle 114, the first dielectric material 118 and the second dielectric material 120 is formed, which may be surrounded by air or ambient environment. The first dielectric material 118 may have a larger refractive index than the second dielectric material 120. Thicknesses and refractive indices of the first dielectric material 118 and the second dielectric material 120 may be selected in designing desired optical properties of the stack 110.

Figure 3H:
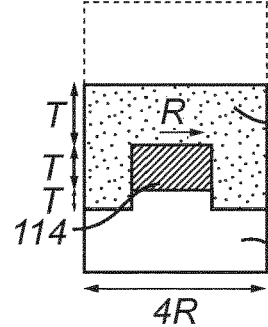

In FIG. 3h, the nanoparticle 114 is arranged on a patterned electrode 112, such that the nanoparticle 114 is arranged on a portion of the electrode 112 having common lateral dimensions as the nanoparticle 114. The portion of the electrode 112 may have a larger thickness than the rest of the electrode 112. The stack of the nanoparticle 114 above the patterned electrode 112 may be surrounded by a dielectric material 116. Thickness of the portion of the electrode 112 having common lateral dimensions as the nanoparticle 114, thickness and refractive index of the dielectric material 118 may be selected in designing desired optical properties of the stack 110.

In FIGS. 3i-l, different patterning of the electrode 112 are shown. These configurations of the electrode 112 may be combined with any of the structures of the nanoparticle 114 and layers arranged on/surrounding the nanoparticle 114 as shown above.

Figure 3I:
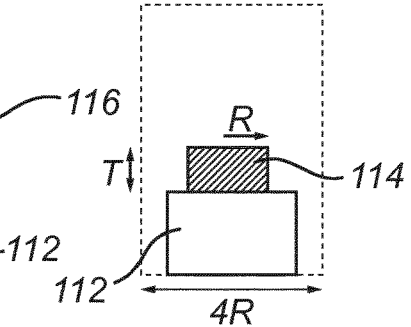

In FIG. 3i, it is illustrated that the electrode 112 does not extend to an edge of the unit cell 104. This implies that the electrode 112 is separated from an electrode of an adjacent unit cell 104.

Figure 3J:
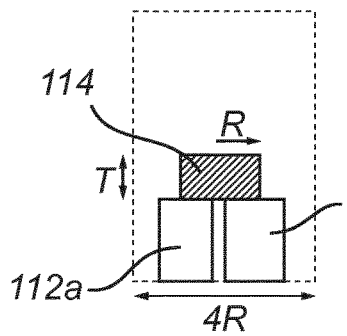

In FIG. 3j, it is illustrated that the electrode is separated in two parts 112a, 112b, which may each make contact with the nanoparticle 114. This may be advantageously used for providing different potentials to the electrodes 112a, 112b such that e.g. a current may be forced through the nanoparticle 114 for controlling heating of the nanoparticle 114 and, hence, a state of the PCM.

Figure 3K:
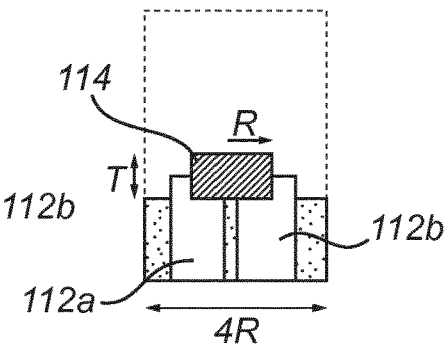

In FIG. 3k, it is illustrated that a space between the electrodes 112a, 112b may be filled by a dielectric material 122 for isolation between the electrodes 112a, 112b. Also, a space between electrodes of adjacent unit cells 104 may be filled by the dielectric material 122 for isolating unit cells 104.

Figure 3L:
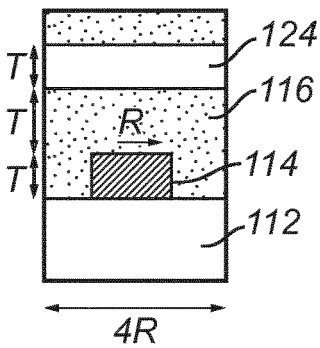

In FIG. 3l, it is illustrated that an electrode 124 is arranged above the nanoparticle 114. The electrode 124 may be arranged on a dielectric material 116, which may be surrounding the nanoparticle 114 corresponding to the configuration in FIG. 3b. It should be realized that other configurations may be used with the electrode 124 arranged above the nanoparticle 114. For instance, the electrode 124 may be arranged in contact with the nanoparticle 114. The electrodes 112, 124 may form an electrode pair for controlling a change of state of the PCM. The electrode 124 may be common to a plurality of unit cells 104, such that the potential provided to the bottom electrode 114 may be used for controlling the changing of state of the PCM.

The electrode 124 above the nanoparticle may be transparent in order to ensure that light is transferred through the electrode 124 to reach the nanoparticle 114. In one embodiment, the electrode 124 may be formed from a conductive metal oxide, such as indium tin oxide (ITO).

The electrode geometries may be optimized such that individual unit cells 104 can be switched. Some examples are given in FIG. 3i-l, where there are gaps between metal films for neighboring pixels to isolate cells electrically from one and other. Also, embodiments where a transparent top electrode is used could be considered, either in contact or non-contact mode. The shape and dimensions of the electrodes can also be adjusted in order to boost optical resonances. Different embodiments include metal electrodes contacting the nanoparticle 114 from the bottom or from the side or a mix of both.

Referring now to FIGS. 4a-f, some different configurations of the stack 110 of the unit cell 104 comprising a nanoparticle 114 are disclosed. These configurations show several features which may be present in various combinations. Thus, further combinations of features of the configurations of the stack 110 may be contemplated. Also features illustrated in the configurations of FIGS. 3a-l above may also be combined with the configurations of FIGS. 4a-f.

It should be realized that dimensions of different features in the stack 110 may be varied and proper dimensions may be selected in order to obtain desired optical properties of the stack 110. Each of the stacks 110 comprise an electrode 112, a patterned nanoparticle 114 and a spacer layer 126 between the electrode 112 and the patterned nanoparticle 114. The thickness and refractive index of the spacer layer 126 may be selected in any of the configurations for designing desired optical properties of the stack 110.

In FIG. 4a, the nanoparticle 114 is embedded in a surrounding dielectric material 116, which forms the spacer layer 126 and also is arranged on top and on the sides of the patterned nanoparticle 114. The dielectric material 116 defines a refractive index of a material surrounding the nanoparticle 114.

In FIG. 4b, the surrounding dielectric material 116 forms the spacer layer 126 and is arranged on top and on the sides of the patterned nanoparticle 114. A thickness of the dielectric material 116 is defined and a value of thickness, as well as the refractive index of the dielectric material 116, may be selected in designing desired optical properties of the stack 110.

In FIG. 4c, a first dielectric material 118 is arranged on the nanoparticle 114 and may be patterned to have common lateral dimensions as the nanoparticle 114. A second dielectric material 116 is arranged to surround the stack of the nanoparticle 114 and the first dielectric material 114 forming also the spacer layer 126. The first dielectric material 118 may have a larger refractive index than the second dielectric material 116. Thicknesses and refractive indices of the first dielectric material 118 and the second dielectric material 116 may be selected in designing desired optical properties of the stack 110.

In FIG. 4d, the surrounding dielectric material 116 forms the spacer layer 126 and is arranged on top and on the sides of the patterned nanoparticle 114. A lateral size of the surrounding dielectric material 116 may define a width of the surrounding dielectric material 116. Thickness, width and refractive index of the first dielectric material 116 may be selected in designing desired optical properties of the stack 110.

In FIG. 4e, the spacer layer 126 is patterned and may be patterned to have common lateral dimensions as the nanoparticle 114. The nanoparticle 114 is arranged on the spacer layer 126. Further, a dielectric material 118 is arranged on the nanoparticle 114 and may be patterned to have common lateral dimensions as the nanoparticle 114. The stack of the spacer layer 126, the nanoparticle 114 and the dielectric material 118 may be surrounded by air or ambient environment. The dielectric material 118 may have a larger refractive index than the spacer layer 126. Thickness and refractive index of the dielectric material 118 may be selected in designing desired optical properties of the stack 110.

In FIG. 4f, a corresponding configuration as in FIG. 4e is shown. However, here the dielectric material 118 and the spacer layer 126 are formed from the same material. Here, it is also indicated that the electrode 112 may be patterned to be separated from an electrode of an adjacent unit cell 104.

In some embodiments discussed above, see FIG. 3b-d, FIG. 3l, FIG. 4b-f, the thickness of the dielectric stack could be designed to realize an anti-reflective coating effect. The dielectric environment could be a low refractive index material (e.g. $SiO_2$) or high refractive index material (e.g. SiN).

These configurations can be designed such that the layer stack minimizes the reflection from the PCM particles, but does not act as an ARC for the metal film in-between the particles. For the cases where an air or ambient environment is provided around a stack, it may be advantageous to use a thin dielectric liner layer for protecting the stack 110.

In some embodiments, a (multilayer) ARC is patterned on top of the nanoparticle 114, see FIG. 3c, 3f, 3g, FIG. 4e-f.

Referring now to FIGS. 5a-l, some different configurations of the stack 130 of the unit cell 104 comprising a cavity 126 are disclosed. These configurations show several features which may be present in various combinations. Thus, further combinations of features of the configurations of the stack 130 may be contemplated.

It should be realized that dimensions of different features in the stack 110 may be varied and proper dimensions may be selected in order to obtain desired optical properties of the stack 110. In any of the configurations discussed below the geometric structure may be designed by selecting size (e.g. radius R) and depth of the cavity 136.

In FIG. 5a, a patterned PCM layer 134 defines the cavity 136. A dielectric material 138 fills the cavity 136 and is also arranged above the PCM layer 134. A thickness of the dielectric material 138 above the PCM layer 134 and the cavity 136, as well as a refractive index of the dielectric material 138 may be selected in designing desired optical properties of the stack 130.

In FIG. 5b, a second dielectric material 142 is formed on the dielectric material 138. The second dielectric material 142 may have a smaller refractive index than the dielectric material 138. Thicknesses and refractive indices of the dielectric materials 138, 142 may be selected in designing desired optical properties of the stack 130.

In FIG. 5c, no material is used for filling the cavity 136. The patterned PCM layer 134 and the cavity 136 is exposed to air or ambient environment. Here, only the dimensions of the PCM layer 134 may be selected in designing desired optical properties of the stack 130.

In FIG. 5d, a similar configuration as in FIG. 5c is shown. Here, a thin metal liner layer 144 is shown on the PCM layer 134 and the cavity 136. This liner layer 144 may have good plasmonic properties and very limited thickness (5-10 nm) as it may allow to improve plasmonic resonance of the cavity 136, while still allowing the geometric structure to have tunability capabilities by means of switching the state of the PCM layer 134. A thickness of the metal liner layer 144 may be selected in designing desired optical properties of the stack 130.

In FIG. 5e, the cavity 136 is formed in a bulk PCM layer 134. Thus, a first thickness of the PCM layer 134 is defined in order to provide a bottom surface of the cavity 136. The cavity 136 is patterned in the PCM layer 134 such that patterned walls having a second thickness larger than the first thickness are formed in the PCM layer 134. The cavity 136 and the PCM layer 134 may be exposed to air or ambient environment. The first thickness of the PCM layer 134 may be selected in designing desired properties of the optical stack 130.

In FIG. 5f, a corresponding cavity 136 as shown in FIG. 5e is formed. On the patterned walls of the PCM layer 134, a pattern of a dielectric material 146 is formed having a corresponding pattern as the patterned walls of the PCM layer 134. The cavity 136 and the patterned walls in the PCM layer 134 and the dielectric material 146 may be exposed to air or ambient environment. The first thickness of the PCM layer 134, the thickness and the refractive index of the dielectric material 146 may be selected in designing desired properties of the optical stack 130.

In FIG. 5g, a corresponding structure as shown in FIG. 5f is formed. A second dielectric material 148 is arranged on the first dielectric material 146. The second dielectric material 148 may have a smaller refractive index than the first dielectric material 146. The cavity 136 and the patterned walls in the PCM layer 134 and the first and the second dielectric materials 146, 148 may be exposed to air or ambient environment. The first thickness of the PCM layer 134, the thicknesses and the refractive indices of the first dielectric material 146 and the second dielectric material 148 may be selected in designing desired properties of the optical stack 130.

It should also be realized that instead of, or in addition to the dielectric material 146, 148 arranged on the patterned walls in the PCM layer 134, a metal layer may be arranged on the patterned walls.

In FIG. 5h, a corresponding cavity 136 as shown in FIG. 5e is formed. Here, a thin metal liner layer 144 is shown on the PCM layer 134 and the cavity 136. This liner layer 144 may have good plasmonic properties and very limited thickness (5-10 nm) as it may allow to improve plasmonic resonance of the cavity 136, while still allowing the geometric structure to have tunability capabilities by means of switching the state of the PCM layer 134. The first thickness of the PCM layer 134, and a thickness of the metal liner layer 144 may be selected in designing desired optical properties of the stack 130.

In FIG. 5i, a pattern is formed in the electrode 132 forming part of a cavity 136 in the electrode 132 such that patterned walls are formed in the electrode 132. A pattern of the PCM layer 136 is formed on the patterned walls of the electrode 132 surrounding the cavity 136. The cavity 136 and the patterned walls in the electrode 132 and the PCM layer 134 may be exposed to air or ambient environment. The thickness of the patterned walls of the electrode 132 and the thickness of the PCM layer 134 may be selected in designing desired properties of the optical stack 130.

In FIG. 5j, the resonance defining layer of the unit cell 104 comprises a PCM layer 134 arranged on the electrode 132. Further, a metal layer 150 is arranged on the PCM layer 134. The metal layer 150 is patterned to define the cavity 136 on the PCM layer 134, wherein the PCM layer 134 forms a bottom surface of the cavity 136. The cavity 136 and the metal layer 150 is exposed to air or ambient environment. The thickness of the PCM layer may be selected for designing desired optical properties of the stack 130.

In FIG. 5k, a corresponding structure as shown in FIG. 5j is shown. A dielectric material 138 fills the cavity 136 and is also arranged above the patterned metal layer 150. A thickness and a refractive index of the dielectric material 138 and a thickness of the PCM layer 134 may be selected in designing desired optical properties of the stack 130.

In FIG. 5l, the resonance defining layer comprises a spacer layer 152, which is arranged between the PCM layer 134 and the patterned metal layer 150. A dielectric material 154 forming the spacer layer 152 may also be configured to fill the cavity 136 in the metal layer 152 and be arranged above the metal layer 152 and the cavity 136 so as to surround the metal layer 152. A thickness of the dielectric material 154 above the metal layer 152, a thickness of the spacer layer 152, a refractive index of the dielectric material 154 and a thickness of the PCM layer 134 may be selected for designing desired optical properties of the stack 130.

In the configurations in FIGS. 5a-l, it is illustrated, i.a., that resonant cavities 136 may be formed in a PCM layer 134 on a metallic film 132 forming the electrode 132, that resonant cavities may be formed in bulk PCM layer 134 on the metallic film 132, and that resonant cavities may be formed in metal layer 150 on top of a PCM layer 134.

The resonant cavities 136 may be embedded in a dielectric matrix, see e.g. FIGS. 5a-b, 5k-l. In some embodiments, the dielectric layer stack is designed to act as an anti-reflective coating for the PCM or metal layer in which the cavity 136 is formed. This could include designing the dielectric layer stack such that it serves as an ARC for one of the PCM layer or metal layer.

It is shown that resonant cavities 136 may be exposed to air/ambient environment. In these cases, it may be advantageous to provide a thin dielectric liner layer for protecting the structure.

In FIG. 5l, it is indicated that a dielectric spacer layer is arranged between the metal layer (electrode) 132 below and the resonant cavity. It should be realized that variations on this theme, providing a spacer layer between the electrode 132 and the cavity 136 are possible for other implementations, such as cavities in bulk PCM, where the thickness of the PCM at the bottom of the cavity 136 is sufficiently small.

In some embodiments, where a thin metal liner layer 144 is shown, see FIG. 5d, 5h, the liner 144 could serve as an electrode as well.

It should be realized that in any of the configurations of FIGS. 5a-l, gaps may be arranged between adjacent unit cells 104 in the electrodes 132, and/or structures for defining the cavity 136. The gaps may e.g. provide for thermal isolation, so that control of a switching of a state of the PCM of one unit cell 104 does not affect adjacent unit cells 104.

It should also be realized that any of the configurations of the electrodes 112 discussed above for FIGS. 3-4 may also be used with the configurations in FIGS. 5a-l.

By properly selecting parameters, it may be possible to design a unit cell configuration that works for multiple wavelengths. From the examples shown below, it can be seen that a single unit cell configuration may fit two substantially different wavelengths, albeit for slightly different in-plane dimensions of the cavities. Therefore, by breaking the in-plane symmetry of such cavities (e.g. rectangular or elliptical shape), two wavelengths can be simultaneously used with the same cavity if both of them are addressed with perpendicular linear polarizations. It should also be realized that a unit cell configuration comprising a nanoparticle 114 may similarly be designed to fit two different wavelengths.

As the overall optical properties of a unit cell 104 are achieved by combining multiple resonances, there is room for trading off different resonances to land with slightly reduced overall performance at each of two (or more) target wavelengths within a single unit cell configuration.

As such, it may also be feasible to design a single unit cell configuration for three different wavelengths. For instance, a hexagonal shape may be used, which may allow the unit cell to be adapted to provide desired properties for three different wavelengths.

With the current approach, all states for the plural wavelengths will be switched simultaneously when changing the PCM state, but it may be possible to design a unit cell configuration in such a way that a unit cell would be on (reflecting/transmitting) for one wavelength and off (non-reflecting/non-transmitting) for another wavelength. For example, the unit cell 104 would be configured to have a first (e.g. crystalline/amorphous) state which is highly reflective for one wavelength and highly absorptive for the other wavelength.

Referring now to FIG. 6, a specific configuration of electrodes 202, 204 will be discussed.

Electrodes 202 may address cells from the bottom for switching of the PCM. The electrodes 202 need not necessarily be in contact with the PCM as it is contemplated that the switching may be heat assisted. In the configuration in FIG. 6, the electrodes 202 addressing the unit cells 104 from the bottom may have minimal interference with the optical performance of the unit cell 104. Exact dimensions of the electrodes 202, 204 can be another design parameter to further enhance optical performance of the unit cells 104.

As shown in FIG. 6, the electrodes 202 and 204 may be arranged in a cross-point architecture, such that a top electrode 202 extending along columns of the unit cells 104 crosses a bottom electrode 204 extending along rows of the unit cells 104 in the position of each unit cell 104. Thus, each unit cell 104 may be addressed by combined signals provided on the bottom electrodes 202 and top electrodes 204.

The top electrode 204 may even be patterned for forming the cavity 136 in the metal layer 150 e.g. according to any one of the embodiments shown in FIGS. 5j-l. In such implementation, the relative dimensions of the cavity 136 with respect to the signal line can be another parameter that may be selected for designing the optical performance.

It should be realized that in at least some of the above described configurations, the unit cells 104 may be used for transmission-based forming of the three-dimensional light field by replacing bottom metal electrodes by transparent conductive electrodes.

Now, some simulation results will be presented in order to give examples of suitable dimensions of the geometric structure for some embodiments.

In all simulations shown, aluminum was used as metal layer (bottom electrode), GST was used as PCM and $SiO_2$ and SiN as dielectric materials using refractive index 1.46 and 1.9, respectively. The resonant structures were designed targeting 488, 532 and 633 nm wavelengths for blue, green and red respectively, as these are commonly used laser wavelengths. For all resonant cavity plots, dimensions are in nanometers when not explicitly specified.

For the initial 3D simulations on resonant unit cells, the dimensions of disk-shaped nanoparticles or cylindrical cavities are defined as function of their radius and thickness or depth for the respective cases.

When simulating the dimensions of these nanostructures, the period P is fixed at 4 times the radius (duty cycle 50%) and periodic boundary conditions are used. This may be changed in a practical example, but simulations below may still be used for proof-of-principle.

FIGS. 7a-d show a schematic overview of two different GST nanoparticle geometries, corresponding to configurations in FIG. 3a and FIG. 4a that were investigated to serve as a unit cell 104. A simple disk-shaped nanoparticle placed directly on top of an aluminum film is shown in FIG. 7a and the same particle separated from the aluminum film by a thin $SiO_2$ spacer is shown in FIG. 7b.

In both cases, the nanoparticles 114 are embedded in an oxide matrix, so in this case there is no well-defined out-of-plane Fabry-Perot type cavity. In some embodiments of the disclosure, this could be one more parameter to select in designing the unit cell 104 in order to boost the performance further.

Figure 8A:
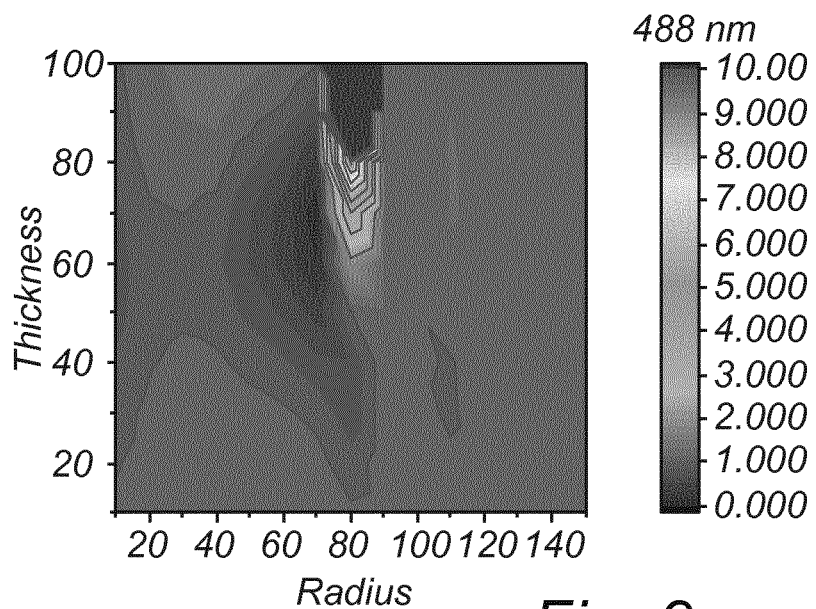
Figure 8B:
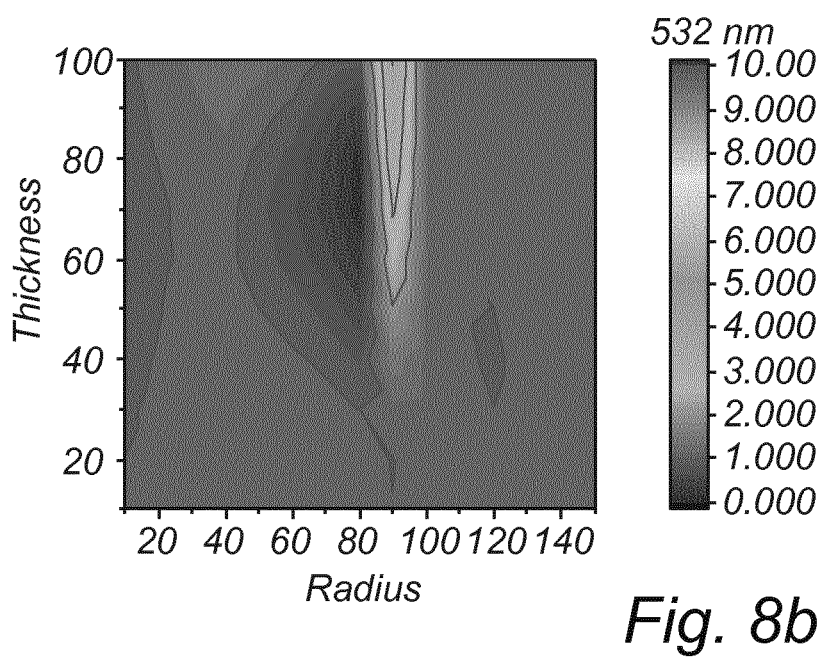
Figure 8C:
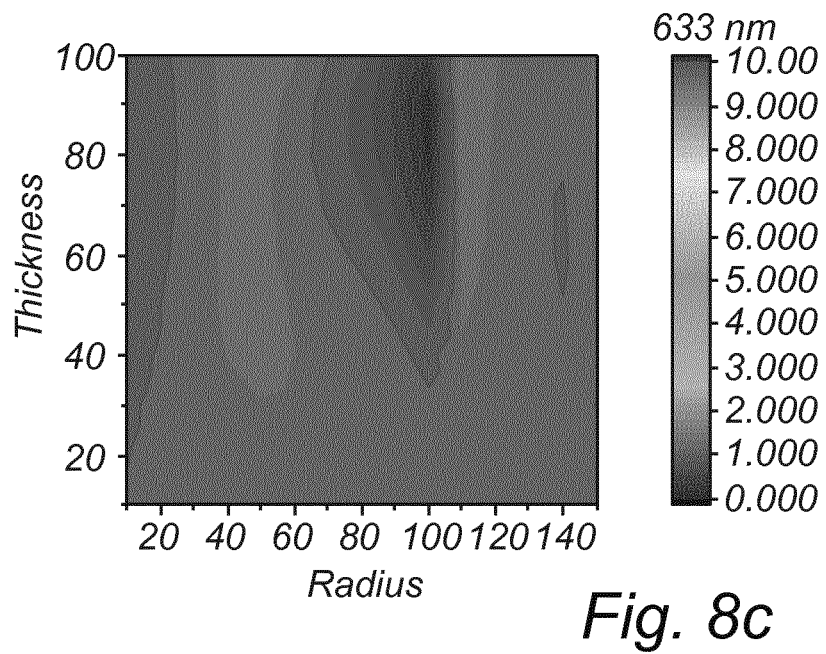
Figure 8D:
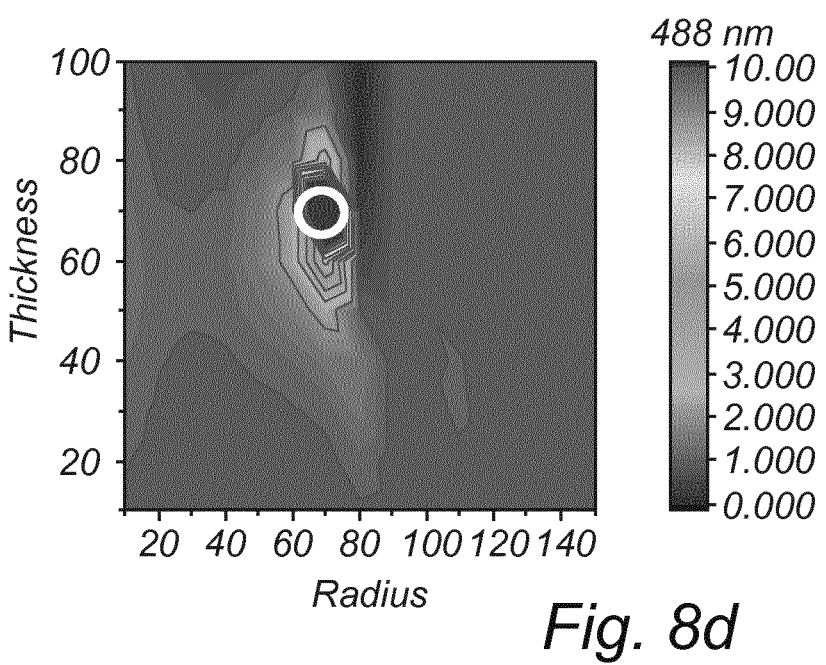
Figure 8E:
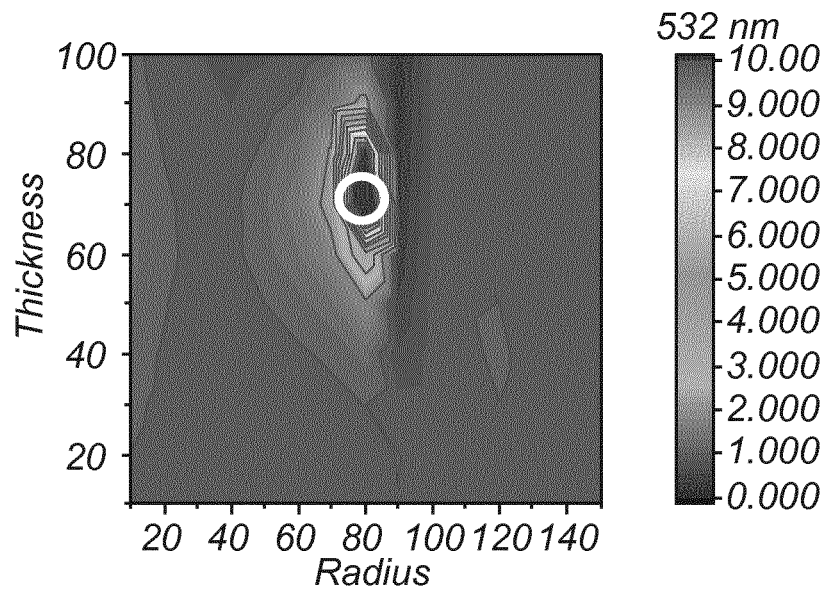
Figure 8F:
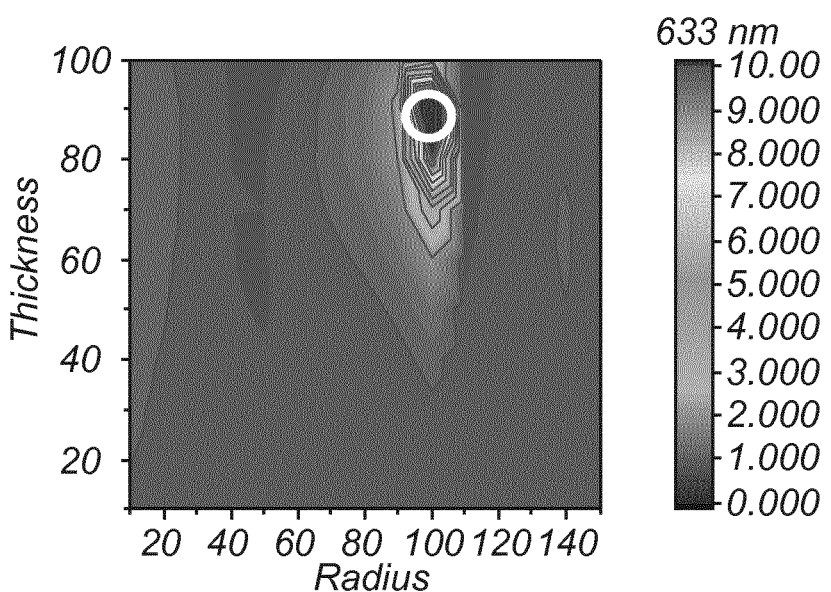

In a simple sweep over the radius R and thickness T of the nanoparticles 114 for configurations in FIGS. 7a and 7b, strongly resonant behavior is observed for both states of the GST, resulting in two detuned resonant states. To assess the performance of the unit cell 104 in FIG. 7a, we look at a reflection ratio in between the two states of the GST in FIGS. 8a-f. In the charts of FIGS. 8a-c, the reflection ratio crystalline/amorphous is shown, whereas in the charts of FIGS. 8d-f, the reflection ratio amorphous/crystalline is shown.

Figure 9A:
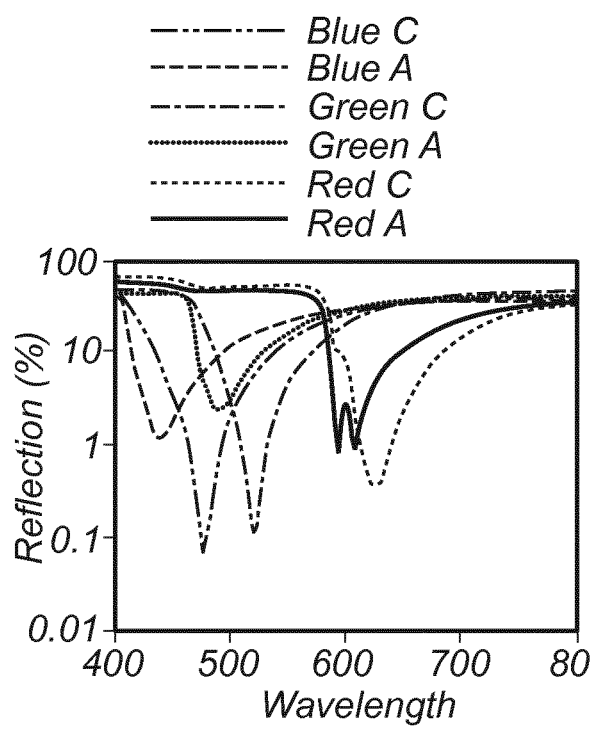
FIG. 9a shows reflection spectra and FIG. 9b shows reflection ratios for three selected cases (indicated by white circles in FIGS. 8d-f).
Figure 9B:
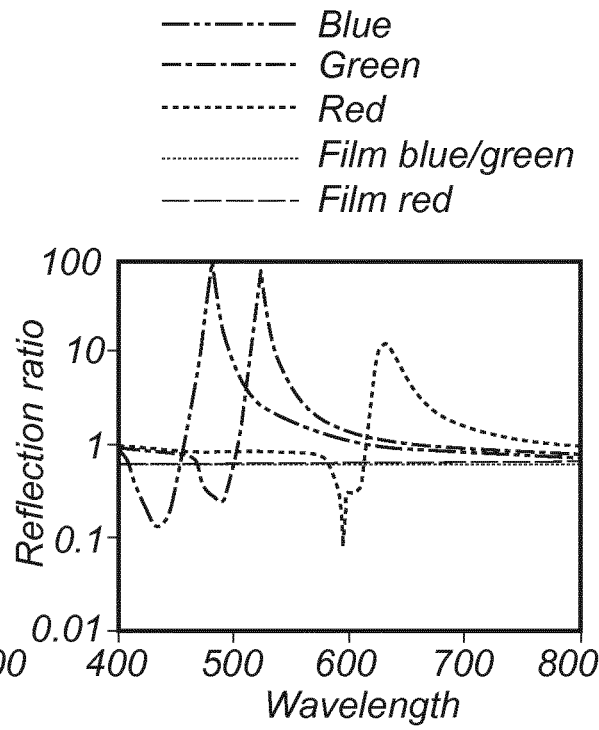

From the reflection ratios it is clear that there are strong resonances present in both GST states, but in terms of maximum reflection ratios the highest values are observed for particle dimensions where the crystalline state is resonant. FIG. 9a shows the reflection spectra and FIG. 9b shows reflection ratios for three selected cases (indicated by white circles in FIGS. 8d-f) targeting blue, green and red light. The dashed lines in FIG. 9b indicate the reflection ratio for a continuous film of the same thickness as the nanoparticles, to illustrate the impact of the localized resonances on the observed effects.

Clearly the localized resonances in the nanoparticles 114 give rise to the large reflection ratios in the unit cell 104, as the film stack with similar thickness shows a fairly flat response. It is worth noticing that GST itself can act as an anti-reflective coating for the aluminum film below, but with low efficiency.

In air, GST is a less efficient ARC compared to the case in oxide, as the larger refractive index contrast between the GST and surroundings causes a large reflection at the first interface, so only a minor portion of the incident light will be allowed to resonate in the cavity formed by the GST layer. In the patterned case shown above, it is clear that at the localized particle resonances, there is much more efficient absorption, which allows to obtain large reflection ratios that would result in efficient pixels with a good on/off ratio.

Figure 10:
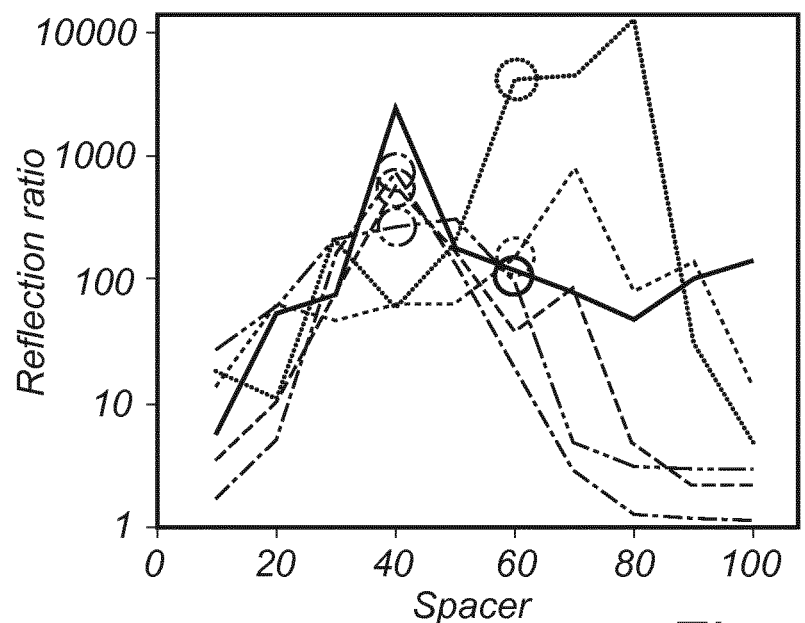
FIG. 10 is a chart illustrating reflection ratios attainable as a function of spacer thickness in the configuration of the unit cell shown in FIG. 7b.

For the second nanoparticle configuration shown in FIG. 7b, a sweep was done over the radius R and thickness T of the GST particle and over the spacer thickness S of the oxide layer between the aluminum film and the particle. In order to identify best candidates to be used as a unit cell 104, FIG. 10 indicates maximum reflection ratios that can be attained as function of the spacer thickness, irrespective of the exact dimensions of the nanoparticle 114. In FIG. 10, the reflection ratios of crystalline/amorphous (C/A) and amorphous/crystalline (A/C) are evaluated.

Compared to the configuration shown in FIG. 7a without a spacer layer between the GST particle and the aluminum, it is clear that the maximum reflection ratios are reaching larger magnitudes when including a spacer layer. To understand the underlying mechanism of these improvements, the differences between both cases may be studied.

Figure 11A:
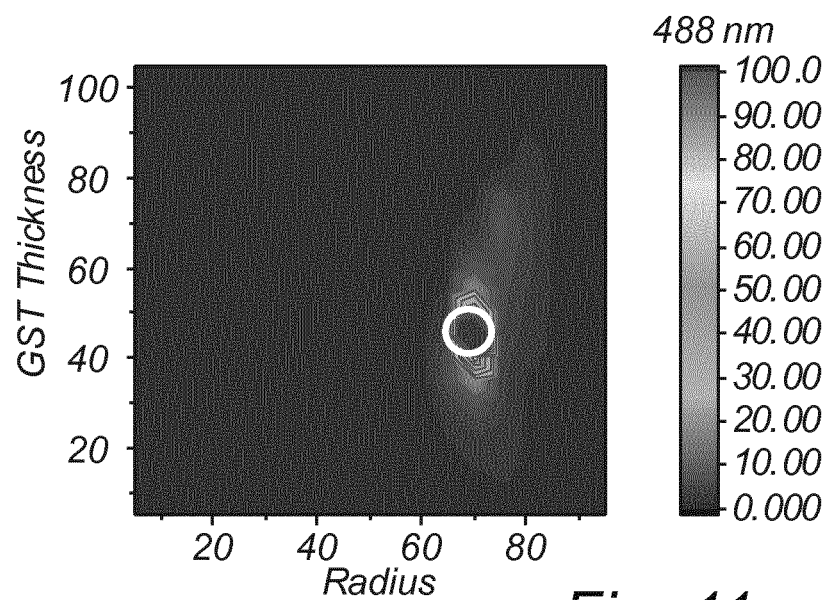
FIGS. 11a-f shows charts illustrating reflection ratios of configurations of unit cells shown in FIG. 7b.
Figure 11B:
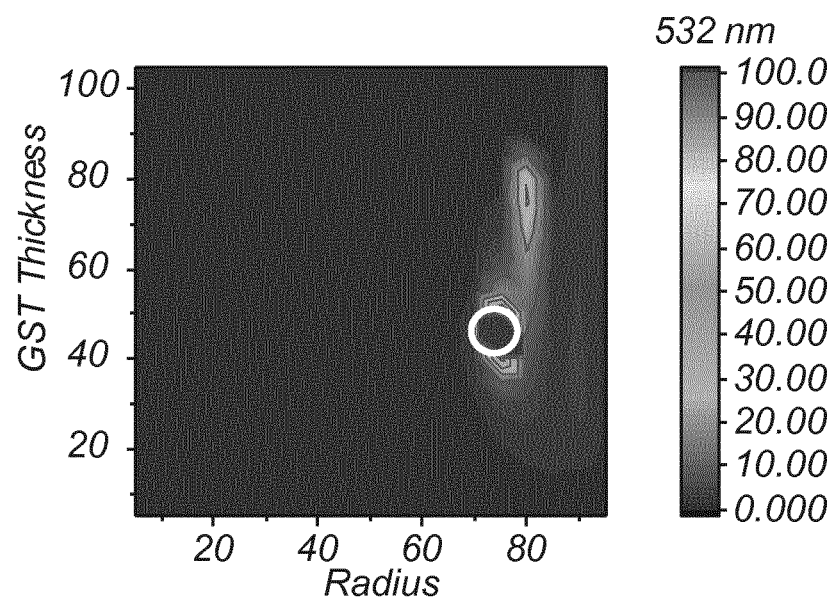
Figure 11C:
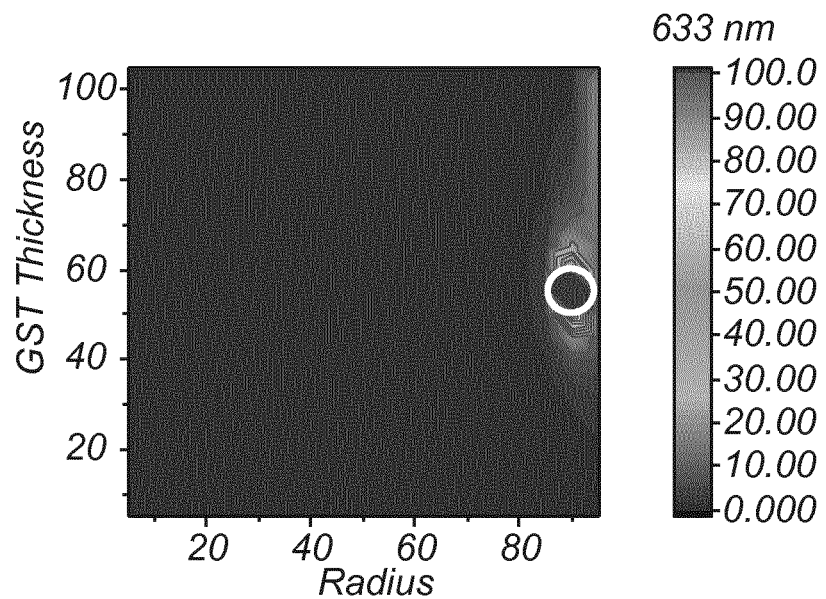
Figure 11D:
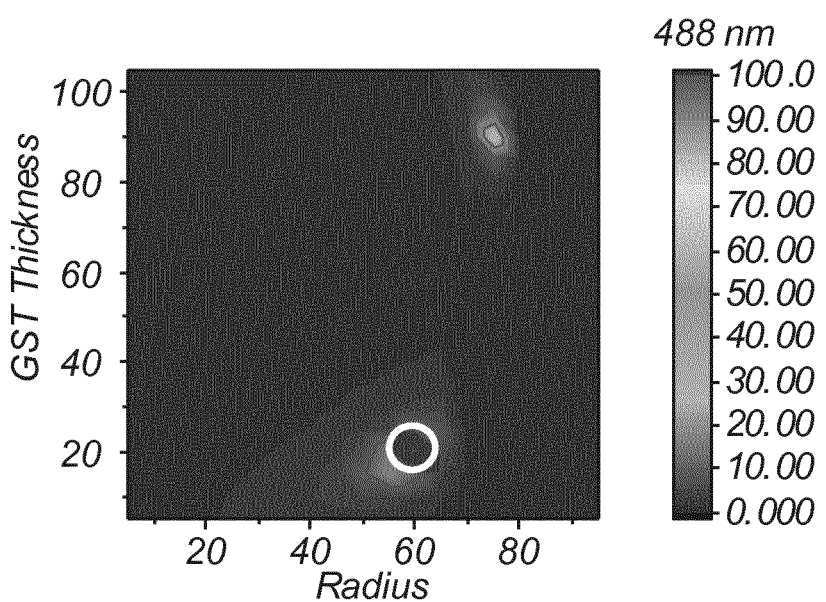
Figure 11E:
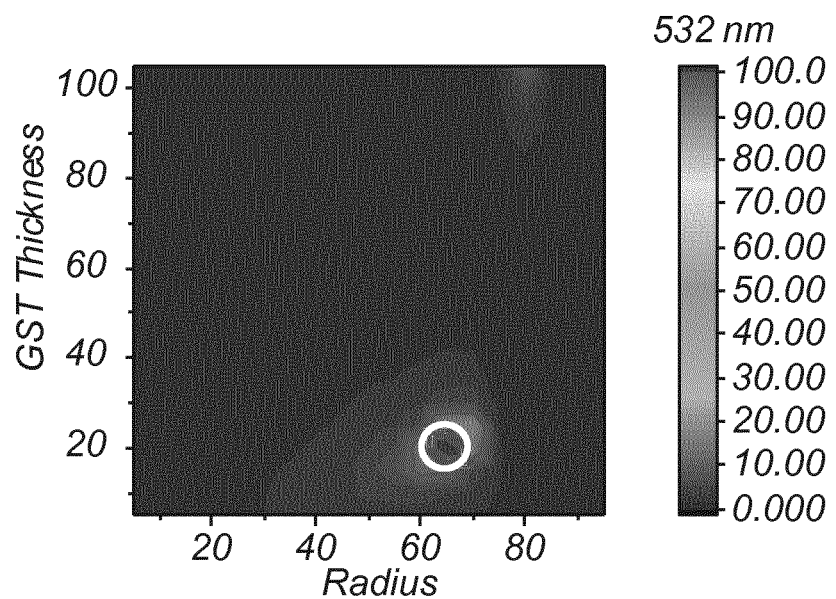
Figure 11F:
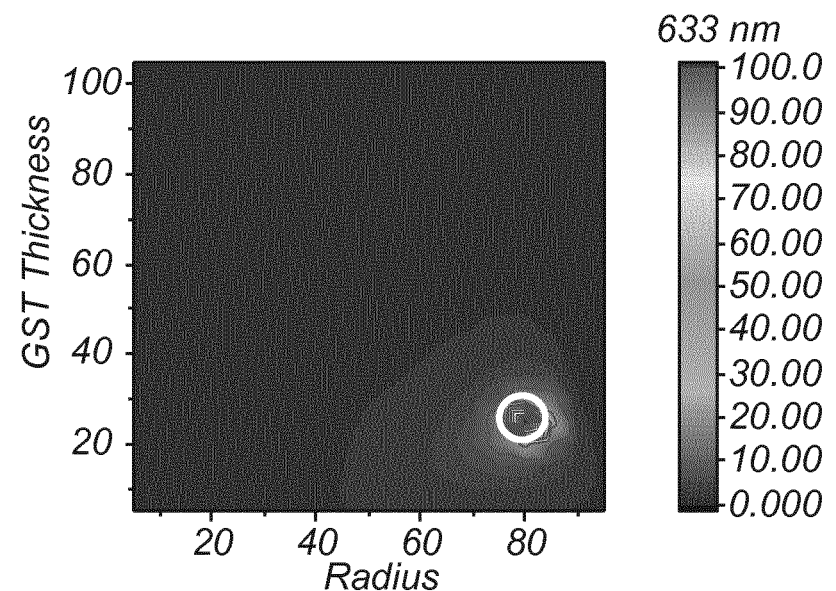
Figure 12A:
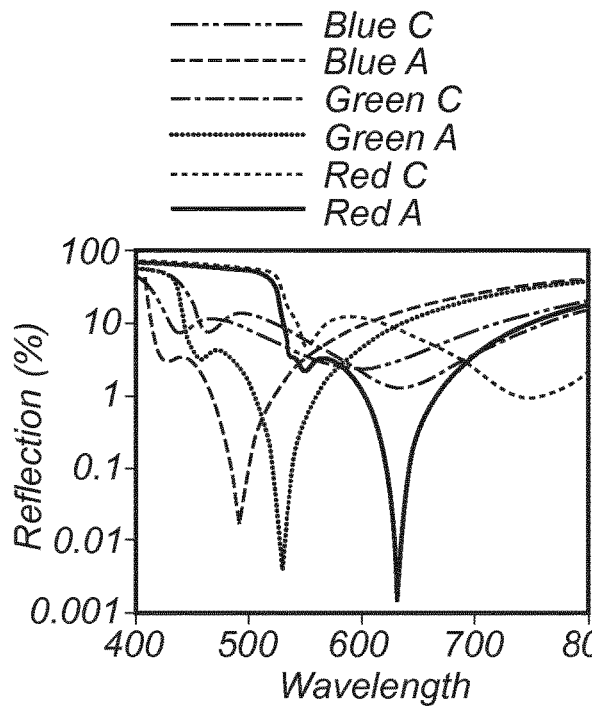
FIG. 12a shows reflection spectra and FIG. 12b shows reflection ratios for the selected cases (indicated by circles in FIGS. 11a-c) and FIG. 12c shows reflection spectra and FIG. 12d shows reflection ratios for the selected cases (indicated by circles FIGS. 11d-f).
Figure 12B:
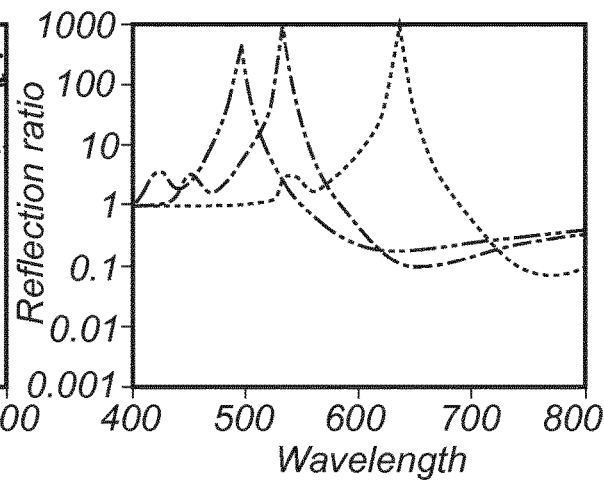
Figure 12C:
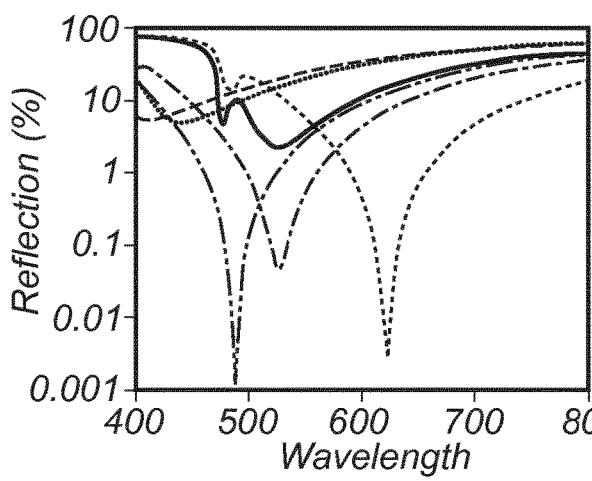
Figure 12D:
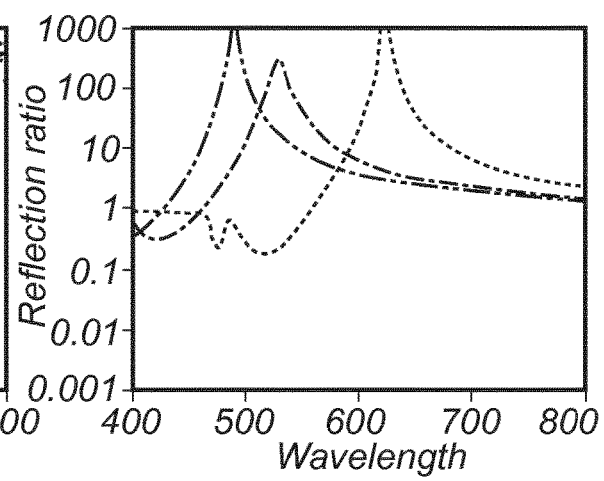

In FIGS. 11a-f an overview of the reflection ratios between crystalline and amorphous for a spacer layer of 40 nm for the three different wavelengths are shown (charts in FIGS. 11a-c) and between amorphous and crystalline for a spacer layer of 60 nm for the three different wavelengths are shown (charts in FIGS. 11d-f). It should be noted that the scales here are saturating at values one order of magnitude above those shown in FIGS. 8a-f.

Overall, much larger reflection ratios are obtained for both cases (crystalline/amorphous and amorphous/crystalline) when adding a properly designed spacer layer between the nanoparticle 114 and the aluminum film 112 below. Moreover, it can be seen that the resonant conditions for both states now occur for smaller GST thicknesses, while the in-plane dimensions to achieve a resonance are very similar to the nanoparticle case without spacer layer. The reflection spectra and corresponding reflection ratios for the selected cases (indicated by circles in charts in FIGS. 11a-f) are shown in FIGS. 12a-d.

From these spectra, several factors that contribute to the improved performance in terms of on/off ratio may be identified. By introducing a spacer layer between the GST nanoparticle and the aluminum film below, the main resonances in both states of the GST are spectrally more separated compared to the case without a spacer layer, which makes it easier to increase the reflection ratio between the two states of GST.

Due to this larger spectral separation, the reflected intensity in the high reflective state is increased, as the operational wavelength (corresponding to the wavelength at which resonance occurs in the low reflective state) is spectrally further away from a wavelength at which resonance occurs in the high reflective state. It may be noted that smaller spacer thicknesses S typically result in larger separation of the resonance modes in the two GST states. Therefore, a smaller spacer thickness S may be advantageous, especially when going to smaller periods for the scatters, as then the resonances in both states will start to broaden and have smaller peak amplitudes.

When comparing the two selected cases for the spacer thickness, it may be seen that for both states of the GST (being designed as low and high reflective states) both reflection ratio and reflected intensities are in the same order of magnitude. Due to the fact that the refractive index of GST in the amorphous state is larger than in the crystalline phase, the particle resonance occurs at shorter wavelengths for the amorphous case in all cases. Therefore, it may be favorable to go for designs where the strongest absorption happens in the crystalline state, which allows to have smaller resonant structures and hence allows the highest possible unit cell density.

When comparing the configuration shown in FIG. 7b including a spacer layer between the aluminum and the GST to the configuration shown in FIG. 7a without spacer layer, it is also clear that the reflected intensities in the low-reflective state are about one order of magnitude lower. This effect can be attributed to the fact that the resonance in the GST nanoparticle is now coupled to the film below where it will induce an out-of-phase dipole, such that the overall electric field profile will be quadrupolar in nature. This effect has been used to generate perfect absorbers.

Turning now to a configuration including a cavity 136 in the unit cell 110, one example is investigated, but it should be realized that different embodiments as indicated in FIGS. 5a-l may be implemented as well.

Figure 13:
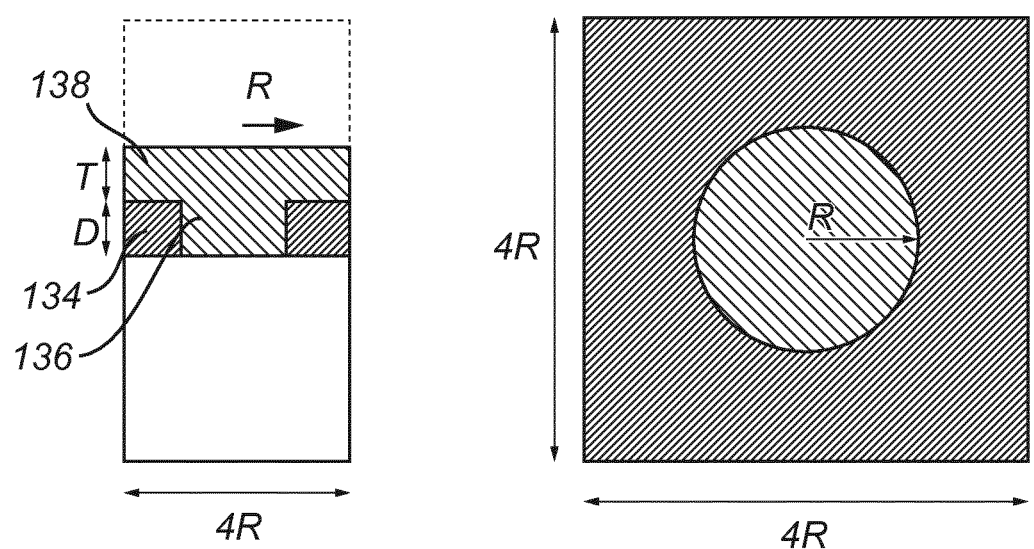
FIG. 13 is a schematic view of another configuration of unit cell for simulation of optical properties.

In the specific implementation investigated here there is one added feature present (compared to the configurations shown in FIG. 7 and investigated above), namely the use of SiN as an ARC. Adding such ARC to nanoparticle geometries could potentially improve their performance. FIG. 13 outlines the unit cell geometry for a cavity 136 defined in GST 134 on top of an aluminum film 132 with the inclusion of SiN 138 as ARC.

Figure 14A:
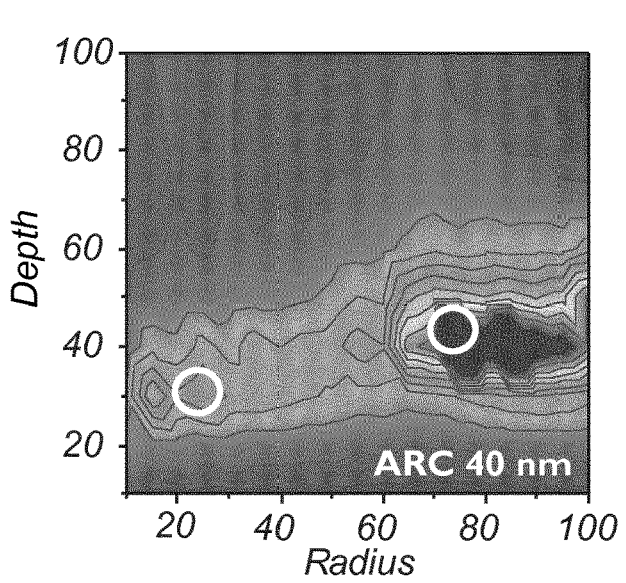
FIGS. 14a-c shows charts illustrating reflection ratios for different ARC thicknesses (depending on the designed wavelength) between crystalline and amorphous GST states.
Figure 14A:
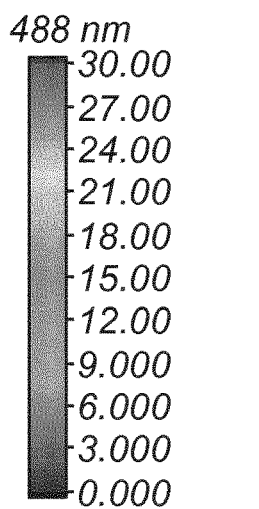
Figure 14B:
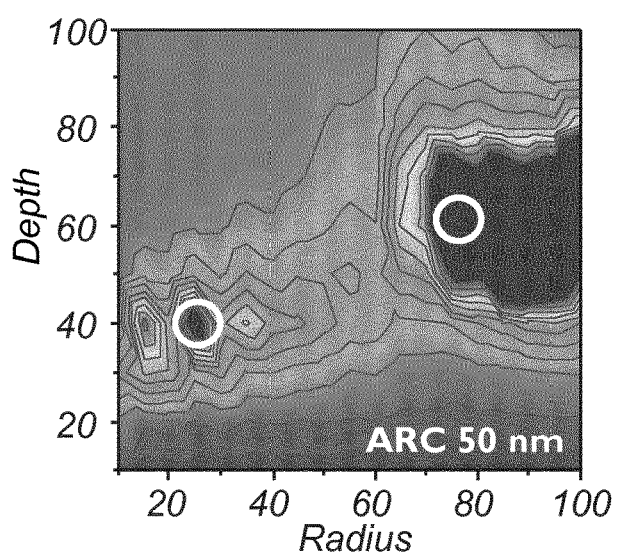
Figure 14B:
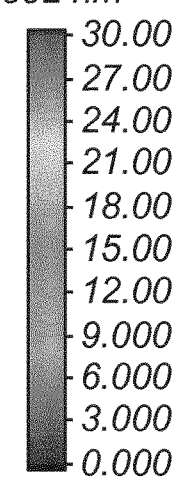
Figure 14C:
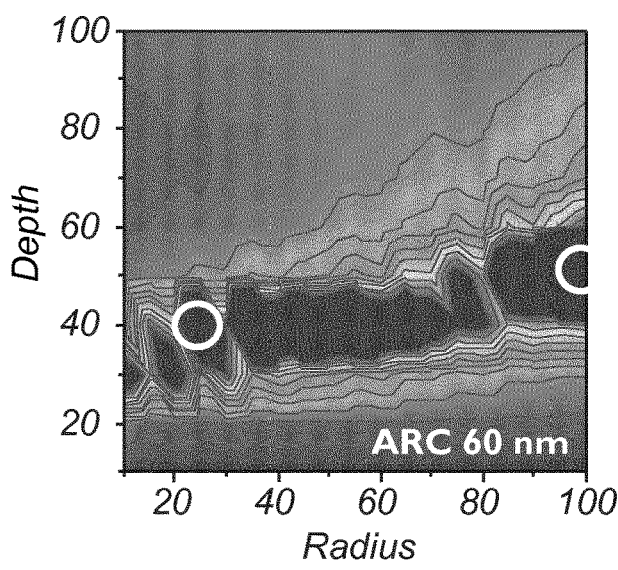
Figure 14C:
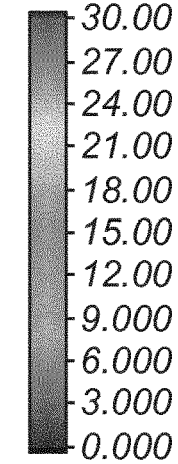

In this basic configuration, there are three parameters that may be selected to tune the cavity resonances, namely the radius R and depth D of the cavity in GST and the thickness T of the SiN ARC on top of the GST. FIGS. 14a-c shows the reflection ratios observed for different ARC thicknesses (depending on the designed wavelength) between crystalline and amorphous GST states.

For the reflection ratios illustrated in FIGS. 14a-c, the saturation value of the reflection values was set at 30, while at the optimum design for all cavities the obtained ratios are much larger. Nevertheless, it can be seen that also for smaller cavity sizes, relatively large reflection ratios can be achieved for very compact cavities, which could be interesting in terms of increasing unit cell densities in the array 102 of unit cells 104.

Optimum designs are indicated with a circle on the right hand side of each chart in FIGS. 14a-c, while more compact versions with lower reflection ratios are indicated with another circle on the left hand side of each chart. For these selected cases indicated by the circles, the corresponding spectra and wavelength dependent reflection ratios are plotted in FIGS. 15a-d.

Figure 15A:
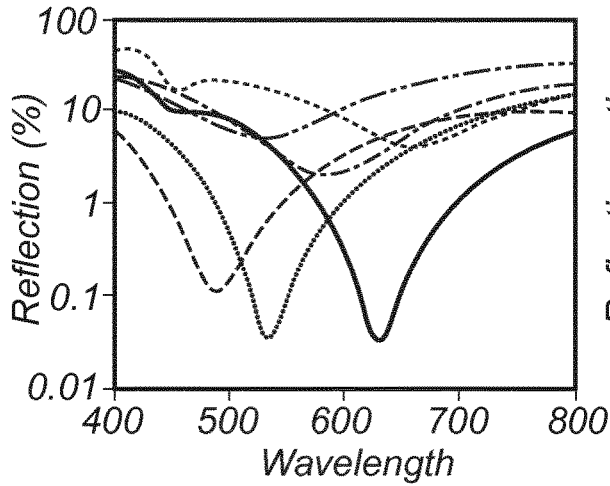
FIG. 15a shows reflection spectra and FIG. 15b shows reflection ratios for designs indicated by right hand side circles of in FIGS. 14a-c and FIG. 15c shows reflection spectra and FIG. 15d shows reflection ratios for designs indicated by left hand side circles in FIGS. 14a-c.
Figure 15B:
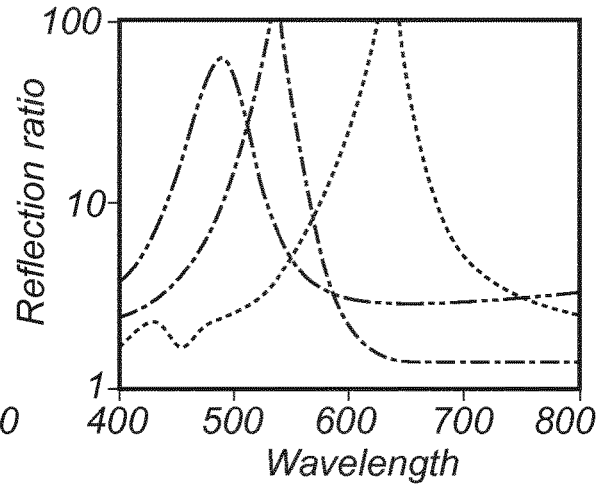
Figure 15C:
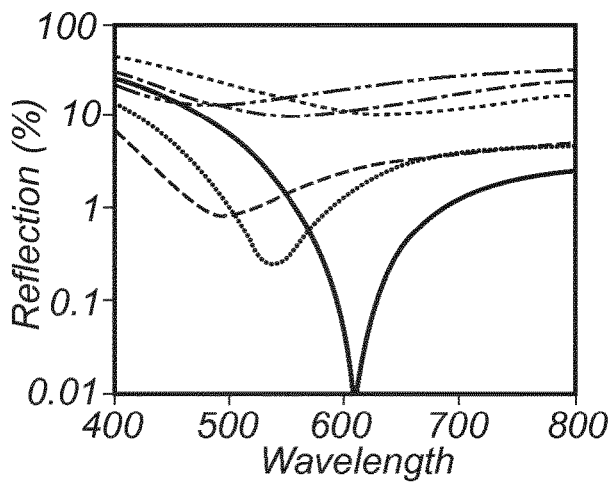
Figure 15D:
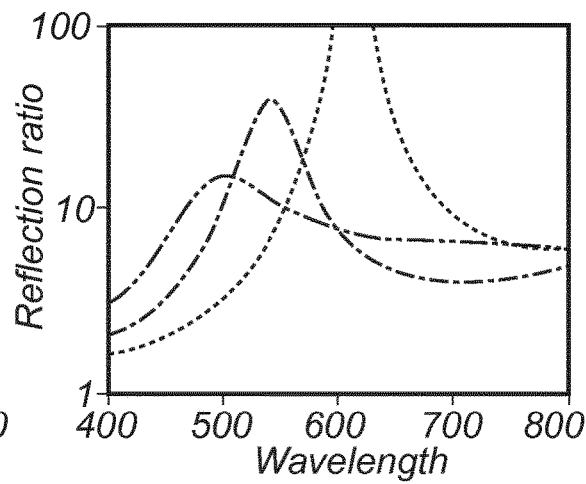

In charts of FIGS. 15a-b, reflection spectra and reflection ratios are indicated for the optimum designs indicated by the right hand side circles of charts in FIGS. 14a-c. In charts of FIGS. 15c-d, reflection spectra and reflection ratios are indicated for the more compact designs indicated by the left hand side circles of charts in FIGS. 14a-c.

For the optimized designs, the localized cavity resonances are quite pronounced with reflection ratios around 100 for all colors. For the more compact versions with a radius of 25 nm, pronounced resonances in the amorphous state are observed and much less pronounced resonances for the crystalline state are observed. Further, it is apparent that the resonances in both GST states are broadened (and reduced in amplitude for blue and green) compared to the optimized designs, which can be attributed to the reduced period which is only 100 nm (4R), such that the resonance modes in neighboring cavities may be interacting much more strongly.

The SiN layer in the configuration of FIG. 13 may play an important role in providing good optical properties. It is believed that the effect is two-fold:

Increased index inside the cavity allows to shrink the size of the cavity further On top of the GST the SiN acts as an ARC (T~$\lambda$/4n), while inside the cavity the thickness is larger (T+D), which means it is not optimized to serve as an ARC on top of the aluminum electrode.

In the above the inventive concept has mainly been described with reference to a limited number of examples. However, as is readily appreciated by a person skilled in the art, other examples than the ones disclosed above are equally possible within the scope of the inventive concept, as defined by the appended claims.

The invention claimed is:

1. An optical device for forming a distribution of a three-dimensional light field, said optical device comprising:
   an array of unit cells, wherein a unit cell in the array of unit cells is individually addressable for controlling an optical property of the unit cell;
   each unit cell in the array of unit cells comprising a stack including:
      at least one electrode for receiving a control signal for controlling the optical property of the unit cell; and
      a resonance defining layer, comprising at least a phase change material, PCM, layer, wherein the resonance defining layer is patterned to define a geometric structure, wherein the geometric structure is dimensioned at least in a plane of the resonance defining layer for defining a wavelength-dependency of resonance in the plane of the resonance defining layer, wherein a dimension of the geometric structure in the plane of the resonance defining layer is defined by a diameter of a circular shape or by a length corresponding to a size of an edge of the geometric structure, and wherein the dimension of the geometric structure is smaller than $\lambda$/2, wherein $\lambda$ is a wavelength of light to be used with the unit cell;
   wherein the at least one electrode is configured to cause a phase change of the phase change material between a first state and a second state based on receiving the control signal and wherein a phase change of the phase change material alters a wavelength-dependency of resonance in the plane of the resonance defining layer for controlling the optical property of the unit cell,
   wherein unit cells in the array of unit cells are separated such that the PCM layer of a unit cell is separated from the PCM layer in an adjacent unit cell.

2. The optical device according to claim 1, wherein the geometric structure extends in one direction in the plane of the PCM layer defining a length of the geometric structure, wherein the geometric structure is dimensioned such that a thickness of the geometric structure is in a range between 0.25*the length of the geometric structure and 1*the length of the geometric structure, wherein the length of the geometric structure is smaller than $\lambda$/2, wherein $\lambda$ is a wavelength of light to be used with the unit cell.

3. The optical device according to claim 1, wherein the geometric structure is circular in the plane of the resonance defining layer.

4. The optical device according to claim 1, wherein the geometric structure has a first size in a first direction in the plane of the resonance defining layer and a second size, different from the first size, in a second direction, different from the first direction, in the plane of the resonance defining layer.

5. The optical device according to claim 1, wherein the geometric structure is a patterned nanoparticle formed by the phase change material.

6. The optical device according to claim 5, wherein the stack of the unit cell further comprises a dielectric material arranged on the patterned nanoparticle.

7. The optical device according to claim 5, wherein the stack of the unit cell further comprises a spacer layer of a dielectric material, wherein the spacer layer is arranged between the electrode and the patterned nanoparticle.

8. The optical device according to claim 1, wherein the geometric structure comprises a cavity defined by patterned walls in a material of the resonance defining layer.

9. The optical device according to claim 8, wherein the cavity is filled by a dielectric material.

10. The optical device according to claim 8, wherein the resonance defining layer comprises a first thickness of the phase change material at a bottom of the cavity and the patterned walls being formed by the phase change material in wall portions having a second thickness larger than the first thickness.

11. The optical device according to claim 10, wherein the stack of the unit cell further comprises at least one layer of dielectric material on top of the patterned walls of phase change material.

12. The optical device according to claim 8, wherein the stack comprises a top metal layer providing a coating of walls and bottom of the cavity.

13. The optical device according to claim 8, wherein the resonance defining layer comprises a PCM layer with homogeneous thickness and a patterned metal layer on the PCM layer, wherein the cavity is defined by patterned walls in the metal layer.

14. The optical device according to claim 8, wherein the stack of the unit cell further comprises a spacer layer of a dielectric material between the electrode and the patterned walls defining the cavity.

15. The optical device according to claim 1, wherein the geometric structure of a first unit cell in the array of unit cells is differently dimensioned in relation to the geometric structure of a second unit cell in the array of unit cells.

* * * * *